United States Patent [19]

Rau et al.

[11] Patent Number: 4,576,003

[45] Date of Patent: Mar. 18, 1986

[54] HYBRID LOAD-SENSE VEHICLE HYDROSTATIC STEERING SYSTEM

[75] Inventors: Jim L. Rau, Lafayette; Ronald L. LaHue, West Lafayette, both of Ind.

[73] Assignee: TRW Inc., Cleveland, Ohio

[21] Appl. No.: 713,085

[22] Filed: Mar. 18, 1985

Related U.S. Application Data

[63] Continuation of Ser. No. 437,633, Oct. 29, 1982, abandoned.

[51] Int. Cl.$^4$ .............................................. F16D 31/02
[52] U.S. Cl. ....................................... 60/384; 60/422; 60/450
[58] Field of Search ................. 60/384, 422, 450, 484; 180/132; 91/6, 31, 518

[56] References Cited

U.S. PATENT DOCUMENTS

| | | | |
|---|---|---|---|
| 3,931,711 | 1/1976 | Rau et al. | 60/445 |
| 4,011,721 | 3/1977 | Yip | 60/450 X |
| 4,043,419 | 8/1977 | Larson et al. | 60/450 X |
| 4,079,805 | 3/1978 | Rau | 60/450 X |
| 4,096,883 | 6/1978 | Yip | 137/596.13 |
| 4,167,893 | 9/1979 | Johnson | 91/446 |
| 4,337,620 | 7/1982 | Johnson | 60/422 X |

*Primary Examiner*—Edward K. Look

*Attorney, Agent, or Firm*—Yount & Tarolli

[57] ABSTRACT

In a hydrostatic load sense vehicle steering system, fluid flow from a source is used by a hydrostatic steering controller to effect steering of the vehicle. The controller has a metering unit and a control valve which, in response to a steering effort, moves away from a neutral position to an operating condition in which it (i) establishes a main flow control orifice which directs fluid from the source to the metering unit and (ii) directs metered fluid to a steering motor. A fluid actuator controls the flow of fluid from the source to the hydrostatic steering controller. A pilot fluid circuit directs a pilot flow of fluid to the controller which is used to control the operation of the fluid actuator. In the controller, the control valve directs the pilot fluid to a reservoir when there is no steering. The system is designed to come to a standby condition in which the amount of pilot fluid being directed to the controller is high enough that it can be used to satisfy a range of low demand steering maneuvers. In providing the pilot flow, the system develops hydraulic biasing forces on the components of the fluid actuator. The hydraulic biasing forces help the system respond to a high demand steering maneuver to increase rapidly the amount of fluid which is made available for effecting steering.

11 Claims, 23 Drawing Figures

STEERING CONTROL VALVE IN NEUTRAL

STEERING CONTROL VALVE AT PARTIAL TRAVEL IN ITS OPERATING RANGE

STEERING CONTROLLER UPON INITIATION
OF STEERING AND DURING OPERATION IN
WHICH PILOT FLUID CAN SATISFY
STEERING DEMAND

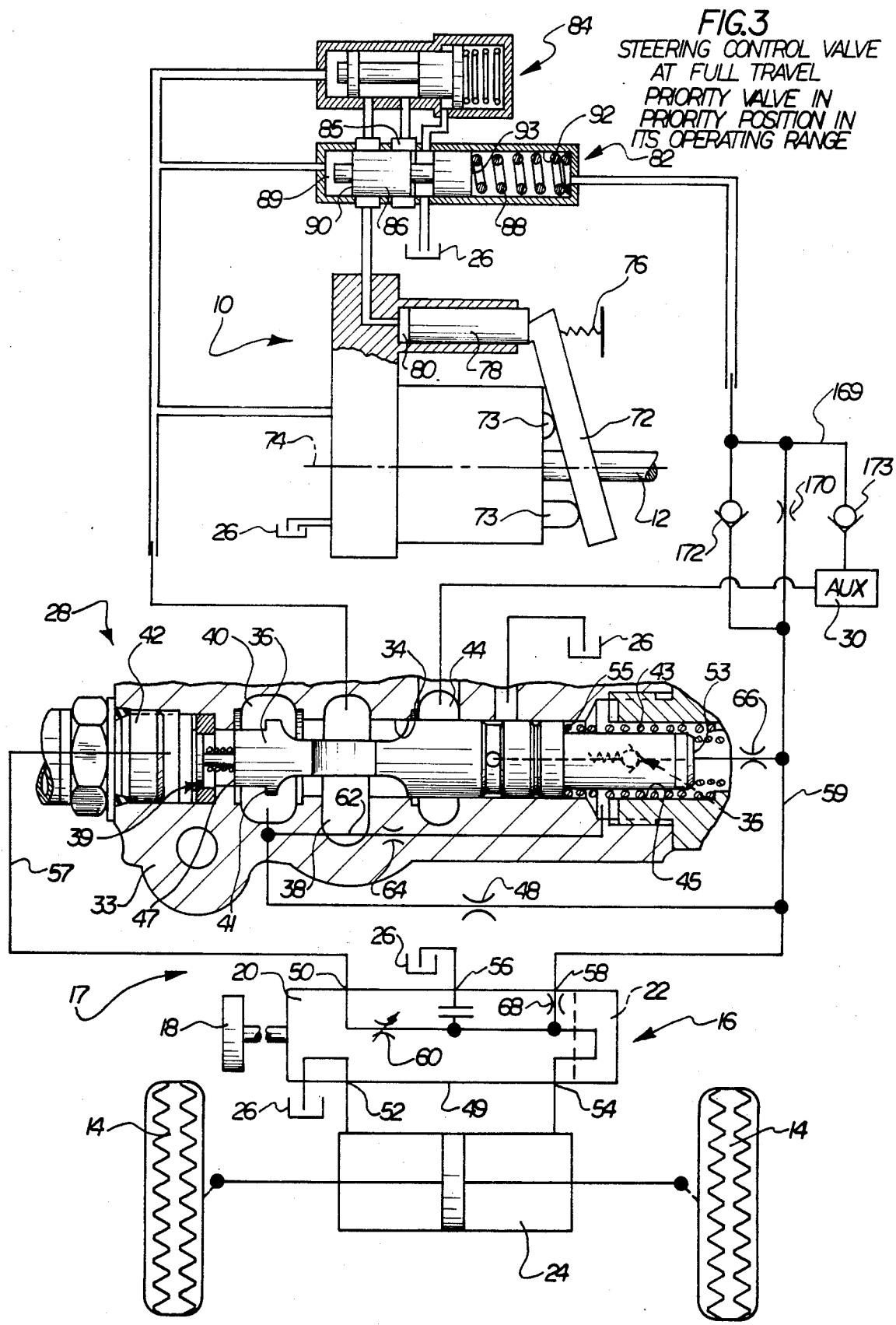

STEERING CONTROL VALVE IN NEUTRAL

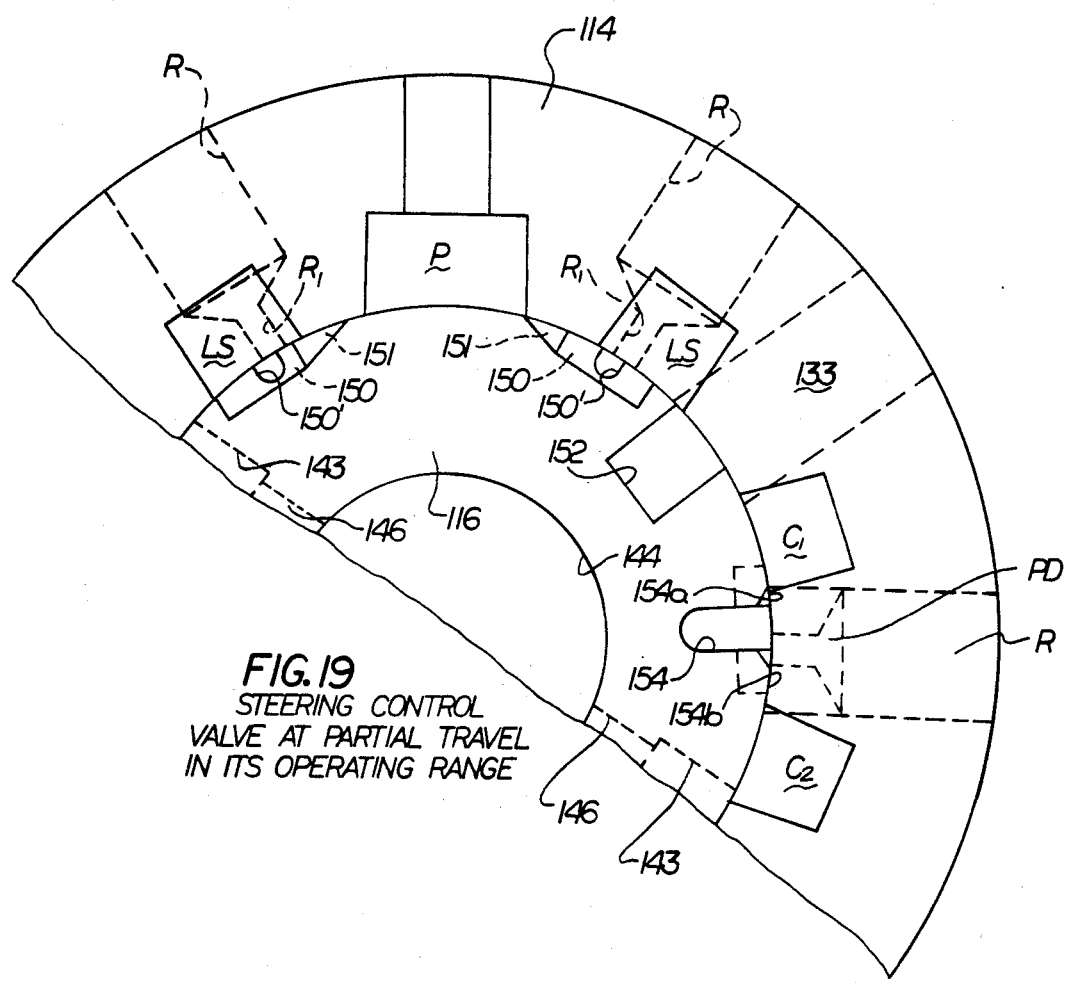
FIG.19 STEERING CONTROL VALVE AT PARTIAL TRAVEL IN ITS OPERATING RANGE
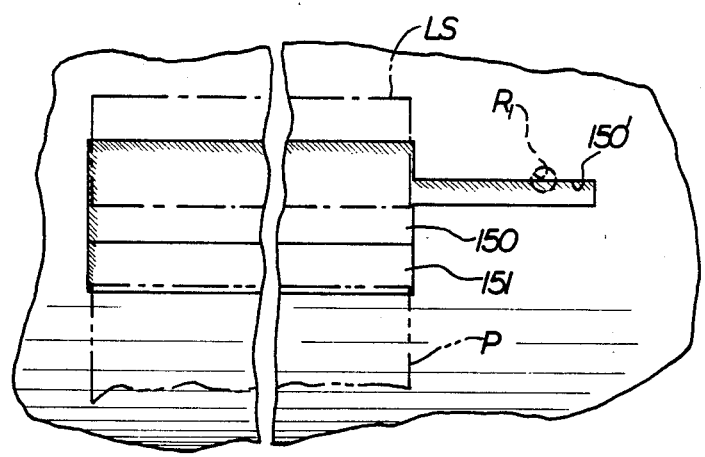
FIG.20

STEERING CONTROL VALVE AT FULL TRAVEL IN ITS OPERATING RANGE

HYBRID LOAD-SENSE VEHICLE HYDROSTATIC STEERING SYSTEM

This is a continuation of co-pending application Ser. No. 437,633 filed on Oct. 29, 1982 now abandoned.

BACKGROUND OF THE INVENTION

This invention relates to a load sense hydrostatic vehicle steering system that includes a fluid source which can deliver variable amounts of fluid (e.g., a variable displacement pump, a fixed displacement pump with a priority valve) and a hydrostatic steering controller which effects steering and also forms part of a pilot circuit for controlling the fluid flow delivered from the source.

In a load sense hydrostatic vehicle steering circuit, when an operator steers, a hydrostatic steering controller receives fluid from a pump, meters the fluid, and directs metered fluid to a steering motor to effect steering of the vehicle. The amount of fluid which is needed to effect steering depends on the rate at which the operator steers (operator demand) and the amount of resistance encountered by the vehicle's wheels (steering load). When the operator is not steering, only a standby amount of fluid needs to be maintained in the steering circuit. Excess fluid, beyond that needed in the steering circuit, can be used for operating auxiliary devices on the vehicle. In most load sense vehicle steering systems, a priority valve operates to assure priority fluid flow to the steering circuit, and to direct excess fluid to an auxiliary circuit where it is available to operate auxiliary devices.

In a system in which the pump has a variable displacement, the pump's maximum displacement is high enough to deliver more fluid flow and pressure than is necessary for making the most demanding of steering maneuvers. When the operator is not steering, or is effecting a steering maneuver which does not require a high flow and pressure, the pump displacement is reduced and/or the priority valve is positioned to reduce the amount of fluid in the steering circuit to a predetermined standby level. When the fluid in the steering circuit is at a standby level, and the operator makes a steering maneuver requiring a higher fluid flow and pressure, the pump displacement is increased, and/or the priority valve is positioned, to bring fluid flow and pressure in the steering circuit to levels which are sufficient to effect steering as demanded by the operator.

U.S. Pat. Nos. 3,931,711 and 4,079,805 show load sense hydrostatic vehicle steering systems in which a hydrostatic steering controller effects steering of the vehicle and also forms part of a fluid control circuit which controls the displacement of a variable displacement pump. When there is no steering, the fluid control circuit sets the displacement of the pump at a minimum level in which the pump maintains fluid in the steering circuit at a standby level. When an operator steers, the fluid control circuit operates to increase pump displacement, when necessary, to insure that the fluid delivered from the pump will be sufficient to effect steering as demanded by the operator.

In the systems shown in U.S. Pat. Nos. 3,931,711 and 4,079,805, the steering controller includes a steering control valve and a positive displacement metering unit. The controller has an inlet port which is connected to the variable displacement pump, and the steering control valve is biased to a neutral position in which it either totally blocks fluid at the controller's inlet port, or directs a small amount of pilot fluid to a reservoir. Thus, the controller is basically "closed center", when the steering control valve is in its neutral position. In response to a steering effort, the steering control valve moves away from its neutral position. After a predetermined range of movement away from its neutral position, the steering control valve reaches an operating condition in which it directs fluid from the controller's inlet port to the metering unit and directs metered fluid from the metering unit to the steering motor. More specifically, when the steering control valve reaches an operating condition, it establishes a main flow control orifice and directs fluid from the inlet port through the main flow control orifice to the metering unit. During steering, when the steering control valve is in an operating condition, the steering control valve has an operating range of movement (relative to the neutral position) in which the flow area of the main flow control orifice varies in accordance with the demand for fluid to effect steering. Specifically, when the steering control valve is in the operating range, the flow area of the main flow control orifice varies directly with variations in (i) the rate at which the operator steers (operator demand) and/or (ii) the amount of resistance encountered by the vehicle's wheels (steering load). In response to a high enough steering demand, the steering control valve will move through its full operating range to a point at which the main flow control orifice will have a fixed, maximum flow area.

In certain of the systems shown in U.S. Pat. Nos. 3,931,711 and 4,079,805, a pressure signal, taken from the downstream side of the variable main flow control orifice, is directed to a load sense port in the controller and used to control the displacement of the pump. Specifically, while the steering control valve is in its operating range, the area of the main flow control orifice, and thus the pressure signal at the load sense port, will vary in accordance with the operator's demand and the steering load. As the pressure signal varies, it varies the displacement of the pump so that the pump delivers an appropriate amount of fluid to effect steering as demanded by the operator. In other systems shown in those patents, a variable area orifice is provided in a pilot circuit which is in parallel with the main flow control orifice. The pilot circuit orifice also varies in area according to the operator demand and/or the steering load, at least over the operating range of the steering control valve. A pressure signal taken from one side of the pilot circuit orifice is directed to the load sense port of the controller and is used to control the displacement of the pump.

In the systems of U.S. Pat. Nos. 3,931,711 and 4,079,805, the fluid source is a variable displacement pump. The principles of the patents are equally applicable for controlling a priority valve, however, as would have been readily obvious to one of ordinary skill.

A further development in load sense hydrostatic steering systems is shown in U.S. patent application Ser. No. 243,497. According to U.S. application Ser. No. 243,497, a steering system may include from a variable displacement pump for directing fluid, through a priority valve, to a steering controller. The steering controller is basically "closed center", but does direct a small amount of pilot fluid to a reservoir, when there is no steering. Specifically, a pilot fluid circuit originates outside the steering controller and communicates with the load sense port of the steering controller. When there is no steering, the steering control valve directs the pilot fluid from the load sense port to the reservoir. Pressure signals, taken at certain points in the pilot fluid circuit, act on the priority valve and on a flow compensator valve which controls the displacement of the pump. The pressure signals determine a standby position for the priority valve and a standby displacement for the variable displacement pump, in order to maintain standby levels of fluid in the system.

In the preferred form of the system according to U.S. application Ser. No. 243,497, when steering is initiated, the steering control valve abruptly restricts the pilot flow. The restriction occurs even before the valve reaches an operating condition in which it establishes the main flow control orifice that directs flow from the inlet port to the metering unit. The abrupt restriction of pilot flow produces a pressure spike in the pilot circuit. The pressure spike acts on the priority valve and on the flow compensator valve which controls the displacement of the pump to (i) urge the priority valve rapidly to its priority position and (ii) urge the flow compensator valve to a position in which the displacement of the pump increases. As steering effort continues, and the steering control valve establishes a flow through the variable main flow control orifice, the pressure in the pilot circuit is controlled by the pressure at the downstream side of the main flow control orifice. The pressure at the downstream side of the main flow control orifice is used to control the position of the priority valve and the flow compensator valve in accordance with the operator's demand and the steering load.

In load sense systems which are basically "closed center", but which also direct a pilot flow of fluid to a reservoir (e.g., the system of U.S. application Ser. No. 243,497), it is desirable to minimize the amount of pilot fluid directed to the reservoir when there is no steering. This is because whatever pilot fluid is directed to the reservoir cannot be used to operate auxiliary devices carried on the vehicle. Ideally, by employing the principles of U.S. Pat. Nos. 3,931,711 and 4,079,805, and the further principles taught by U.S. application Ser. No. 243,497, only a very small amount of pilot fluid (e.g., 0.25 gal/min) should be directed to the reservoir. The pilot flow to the reservoir will be just enough to (i) maintain a minimum standby fluid pressure level in the steering circuit when there is no steering and (ii) effect a rapid increase fluid flow from the source to the steering circuit during steering, and thereby insure that during steering, there will be adequate fluid flow and pressure in the steering circuit to effect steering as demanded by an operator. In such a system, a variable displacement pump could have a very low displacement position when the system is in standby, and be brought up from its low displacement position when there is a need for flow and pressure in the steering circuit.

Experience has shown that some variable displacement pumps react slowly when the system described above tries to bring them up from a very low displacement position. The inertia of the components which have to initially move in order to increase the pump's displacement, and thereafter the compressibility of the working fluid (e.g. oil), are the primary factors in delaying the pump's reaction time. Further, some large area priority valves also have a high inertia, which can make it difficult to get the priority valves to respond to steering as quickly as is desirable. Since load sense systems are expected to react to steering demands in fractions of a second, a fluid source whose response is delayed for even a very small time beyond that which is intended may be unsuitable for use in a load sense system.

SUMMARY OF THE INVENTION

This invention provides a hydrostatic vehicle load sense steering system which will improve the reaction of a source when an operator initiates a steering manuever. The system of the invention will provide a response that is improved beyond the type of response that can generally be attained by optimizing the components of the system for high inertia and fluid compressibility considerations.

In the system of the invention, a main conduit communicates fluid to the inlet port of a steering controller, and a pilot circuit communicates pilot fluid to the load sense port of the controller. When there is no steering, the fluid at the controller's inlet port is blocked, and the fluid in the pilot circuit is directed to a reservoir. The system is designed so that it can come to a standby condition in which the amount of pilot fluid directed to the steering controller is high enough (e.g. 1 gal/min.) that it can be used to effect certain low demand steering maneuvers.

In producing the pilot flow, the fluid source will be in a "primed" condition, and there will be hydraulic fluid bias forces on the components of the source which have high inertia. The hydraulic fluid bias forces will bias the high inertia components in the direction they must move in order to further increase the fluid flow to the steering circuit. During steering, if the controller signals the source to increase the fluid flow to the steering circuit, the hydraulic fluid bias forces on the high inertia components help the components move quickly to position(s) where the additional fluid flow is delivered to the steering circuit. The response of many sources whose components have a high inertia will thus be improved.

In the system of the invention, the steering controller operates in a hybrid fashion, in the sense that it has an "open center" mode of operation for a range of low demand steering maneuvers and a "closed center" mode of operation for higher demand steering maneuvers. Specifically, for a range of low demand steering maneuvers, the pilot fluid alone may be sufficient to effect steering as demanded by an operator. In the low demand range, the flow of pilot fluid to the reservoir is restricted, and pilot fluid is metered and directed to the steering motor to effect steering. Even if the controller's main flow control orifice is open, there will not be any flow through it, since the pilot fluid is sufficient to effect steering. Thus, as to low demand steering maneuvers, the system is operating in an "open center" mode. For higher steering demands, additional fluid flow must be directed from the inlet port to the metering unit in order to effect steering as demanded by the operator. Thus, as to higher demands, the system operates with fluid from the inlet port in a "closed center" mode.

In the applicant's system, when the steering control valve is in its neutral position, a little more pilot fluid than is ideal is directed to the reservoir. However, the system utilizes the greater pilot flow to improve the response of the system. Further, the amount of increased pilot flow which is lost to the remainder of the system is still relatively small, and is certainly acceptable, from the applicant's viewpoint, when measured against the improved system response it can provide.

With the system of the invention, even where the components which determine the speed of response of the fluid source have high inertia, the overall pressure-flow response of the source can be brought to acceptable levels.

BRIEF DESCRIPTION OF THE DRAWINGS

Further features and advantages of the present invention will become apparent from the following detailed description of a preferred embodiment thereof made with reference to the following drawings wherein:

FIG. 3 is a schematic illustration of the load sense hydrostatic steering system of the invention, showing the positions of the various components during steering, when there is a high demand for flow and pressure for steering, and the control valve has moved through its full operating range;

FIG. 19 is a fragmentary schematic view of a section of the control valve in the steering controller, when the system is in the condition of FIG. 2;

FIG. 20 is a fragmentary schematic plan view of a part of the control valve spool in the steering controller, when the control valve is in the position of FIG. 19;

DETAILED DESCRIPTION OF THE PREFERRED EMBODIMENT

Figure 1:
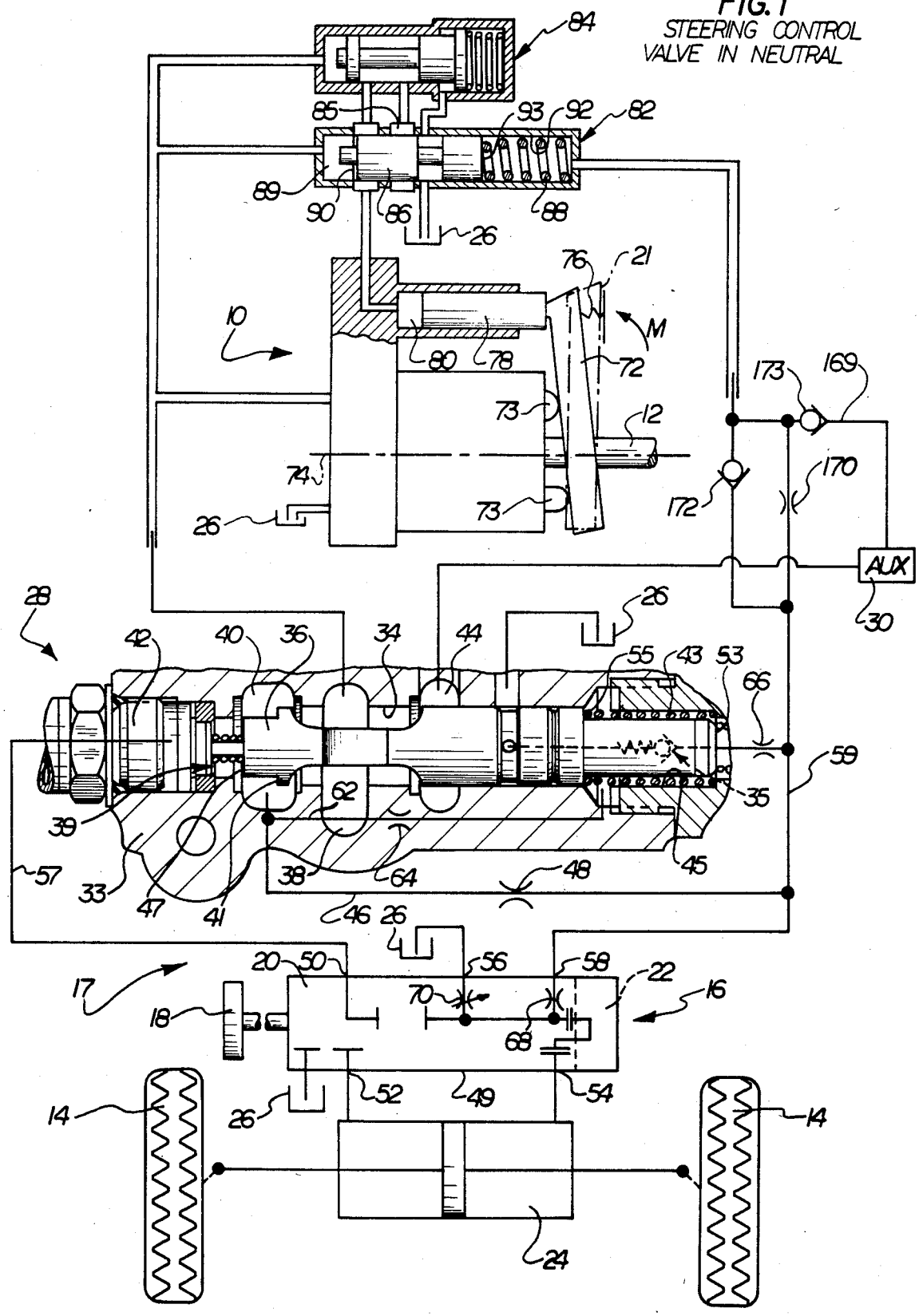
FIG. 1 is a schematic illustration of a load sense hydrostatic steering system according to the invention, showing the positions of the various components when there is no steering demand.
Figure 2:
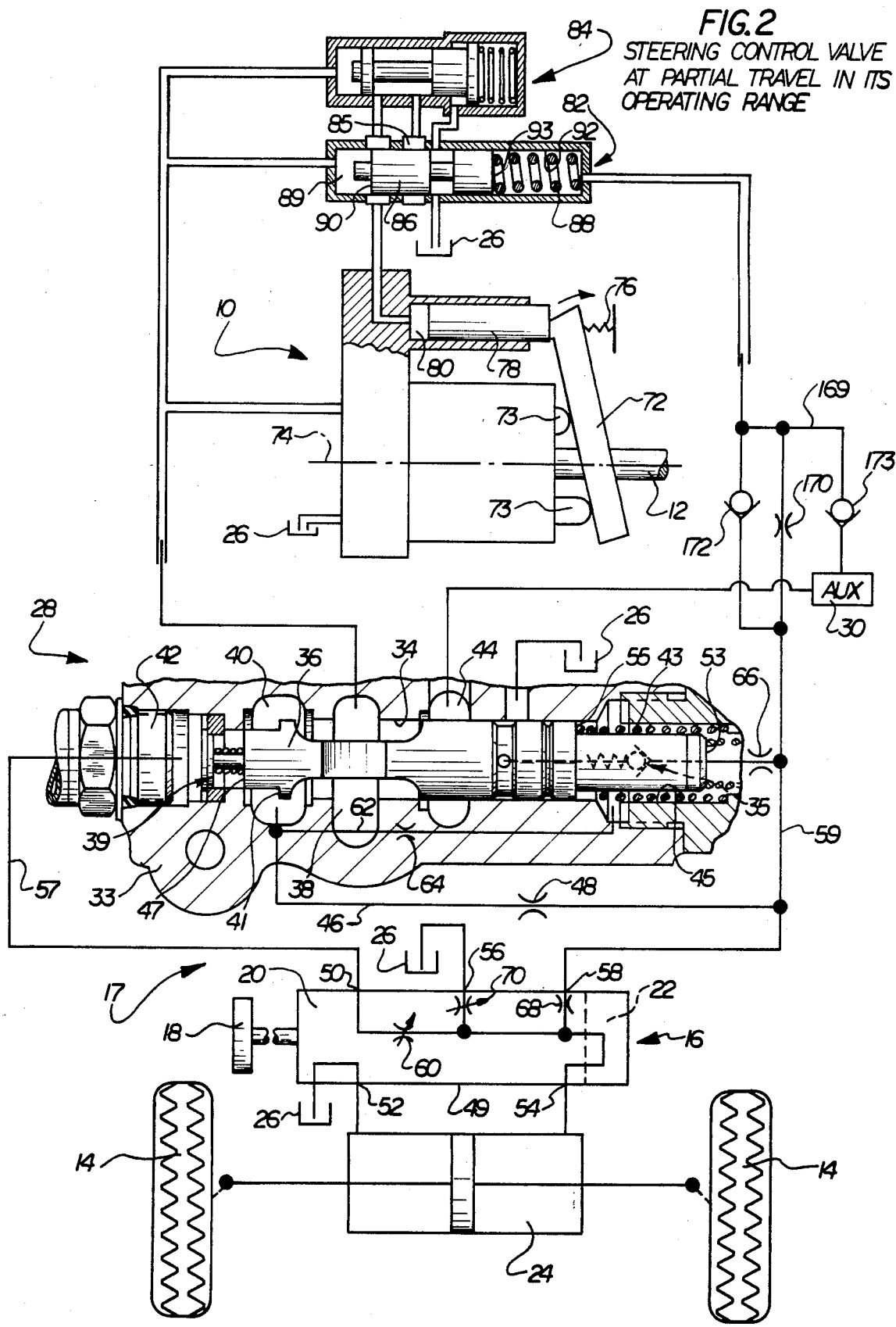
FIG. 2 is a schematic illustration of the load sense hydrostatic steering system of the invention, showing the position of the various components during steering, as the steering control valve moves in its operating range.

Referring to FIGS. 1-3, a vehicle steering system includes a variable displacement pump 10 which is driven by an input shaft 12. Fluid delivered from the pump 10 is directed through a priority valve 28 to a steering circuit 17. Excess fluid, beyond that needed in the steering circuit 17, is directed by the priority valve 28 to an auxiliary circuit 30 where the fluid is available to operate one or more auxiliary devices carried on the vehicle.

The steering circuit 17 includes a steering motor 24, which is connected to the vehicle's wheels 14, and a hydrostatic steering controller 16 which controls fluid to operate the steering motor 24. The hydrostatic steering controller 16 includes a control valve 20 and a positive displacement metering unit 22 which are operated by rotation of the vehicle's steering wheel 18. When the steering wheel 18 is rotated, the controller 16 meters fluid and directs the metered fluid to one chamber of the steering motor 24, while connecting the other chamber of the steering motor 24 to a reservoir 26. As the steering motor 24 is operated, it effects turning of the vehicle's wheels 14 in a manner which is well known, and need not be further described.

The pump 10 is preferably an axial piston pump with a swash plate 72 which determines the length of stroke of a series of pistons 73. The swash plate 72 can pivot relative to a central axis 74 in order to vary the length of stroke of the pistons 73, and thereby vary the displacement of the pump.

The swash plate 72 is biased by a spring 76 toward the position shown in FIG. 3. The position of the swash plate in FIG. 3, which is referred to as the maximum displacement position, places the pump 10 at its maximum displacement. The swash plate 72 can pivot in the direction shown by the arrow in FIG. 2 to reduce the displacement of the pump. Theoretically, it could pivot to a point at which the pump's displacement is as low as possible, yet the pump delivers a small standby amount of fluid to the system. Such a swash plate position is referred to as the minimum displacement position and is represented in phantom at 21 in FIG. 1. Between its maximum and minimum displacement positions, the swash plate 72 has what may be termed intermediate positions. In its intermediate positions, the swash plate sets the displacement of the pump above its minimum level and below its maximum level.

The position of the swash plate 72 depends upon the force of spring 76 and the pressure in a fluid chamber 80 formed on one side of a hydraulic fluid actuator 78. When the fluid chamber 80 is communicated with the reservoir 26, the spring 76 forces the swash plate 72 to the position of FIG. 3 to set the pump 10 in its maximum displacement position. When the fluid pressure in the chamber 80 produces a force on the actuator 78 which overcomes the force of spring 76, the swash plate 72 is shifted away from its maximum displacement position (in the direction shown by the arrow in FIG. 2) to reduce the pump's displacement.

The pressure in the chamber 80, and thus the displacement of the pump 10, is controlled by a valve arrangement comprising a flow compensator valve 82 and a pressure compensator valve 84. The flow compensator valve 82 includes a valve element 86 which is biased by a spring 88 toward the position shown in FIG. 3. In the position of FIG. 3, the flow compensator valve element 86 communicates the fluid chamber 80 to the reservoir 26, by communicating a cavity 85, which is connected to chamber 80, to the reservoir 26. Fluid pressure from the outlet of the pump is communicated to a chamber 89 on one side of the valve element 86 and acts against one end surface 90 of the valve element 86. Fluid pressure in a pilot conduit 59 (described more fully hereinafter) is communicated to a spring chamber 92 and acts on the opposite end surface 93 of the valve element 86. When the net fluid pressure force on the valve element 86 exceeds the force of spring 88, the valve element 86 is shifted rightwardly from the position of FIG. 3. When the valve element shifts rightwardly from the position shown in FIG. 3, it communicates fluid from the fluid chamber 89 to the fluid chamber 80. The fluid acts on the actuator 78 to shift the swash plate 72 in the direction shown by the arrow in FIG. 2 to reduce the displacement of the pump.

As indicated earlier, there are factors which can adversely affect the speed with which the pump's displacement can be increased where there is a steering demand. For example, the pump 10 is preferably a 2.77 CID variable displacement, axial piston pump, manufactured by The Cessna Aircraft Company, Wichita, Kans. When the fluid chamber 80 is connected to the reservoir 26, the spring 76 urges the swash plate 72 toward its maximum displacement position (FIG. 3). Further, the pumping action of the pistons 73 produces a net moment M (FIG. 1) on the swash plate 72, which also biases the swash plate 72 in a direction which increases the pump displacement. Specifically, as seen in FIGS. 1-3, there are pistons 73 on both sides of the central axis 74 of the pump. Although not shown in FIGS. 1-3, there are more pistons at the outlet (high pressure) side of the pump disposed below the central axis 74 than there are pistons at the outlet side of the pump disposed above the central axis 74. The unbalance in the piston arrangement produces the net moment M acting counterclockwise on the swash plate 72. The magnitude of the moment depends on the pump's output pressure. If the pump is at its minimum standby pressure, the net moment M on swash plate 72 due to the pistons 73 is negligible, and the spring 76 is essentially the only motive force which can urge the swash plate 72 in a direction for increasing pump displacement. If there were a sudden high steering demand, and if the pump stroking mechanism has high inertia, the spring 76 might not be able to drive the swash plate 72 fast enough to increase the pump's displacement fast enough to make the pump acceptable for many load sense systems. Additionally, if the working fluid is not delivered immediately, the compressibility of the fluid can result in pump pressure still not increasing in accordance with demand.

With a system according to the invention, even when there is no steering, the pump's displacement will be above the minimum level (but well below the maximum level). The length of stroke of the pistons 73 will be increased, the pump's outlet pressure response will be increased, and the net moment M (FIG. 1) produced by the pistons 73 on the swash plate 72 will thereby be increased. Thus, if there was a sudden steering demand, the increased moment M would assist the spring 76 in rapidly moving the swash plate 72 to a position in which the pump's displacement is increased further.

As discussed above, the fluid delivered by the pump 10 is directed to the priority valve 28. In turn, the priority valve 28 directs priority fluid flow to the steering circuit 17 and excess fluid flow, beyond that needed in the steering circuit 17, to the auxiliary circuit 30. The fluid directed to the auxiliary circuit 30 can be used to operate one or more auxiliary devices on the vehicle.

The priority valve 28 includes ahousing 33, which defines an elongated chamber 34, and a valve element 36 which is axially movable in the chamber 34. The housing 33 has (i) an annular inlet cavity 38 which receives fluid from the pump 10, (ii) an annular priority outlet cavity 40 which communicates (through a priority port 42 and a one-way check valve 39) with the steering circuit 17, and (iii) an annular auxiliary outlet cavity 44 which communicates with the auxiliary circuit 30. Each of the cavities 38, 40, and 44 encircles the chamber 34 and is spaced along the chamber from the other cavities. The valve element 36 operates to control flow from the inlet cavity 38 and direct it to the priority outlet cavity 40 and/or the auxiliary outlet cavity 44.

The valve element 36 is biased by a spring 43 toward a priority position (FIG. 3) in which there is no flow from the pump 10 to the auxiliary circuit. Thus, all flow from the pump 10 is made available to the steering circuit 17. When no steering is taking place, or when the fluid being directed to the steering circuit 17 is sufficient to effect the steering maneuver demanded, the priority valve element 36 can move away from its priority position and direct excess flow, i.e., beyond that needed for steering, to the auxiliary circuit 30.

In accordance with the basic principles of U.S. application Ser. No. 243,497, the valve element 36 can move away from its priority position when a fluid pressure force which acts on the valve element 36 exceeds the force of the spring 43. Specifically, the fluid pressure in the priority outlet cavity 40 acts on the surfaces 41 and 47 at one end of the valve element 36. Fluid pressure at a point in the pilot fluid circuit (described more fully hereinafter) is communicated to a spring cavity 45, and acts on the surfaces 53, 55 at the other end of the valve element 36. Thus, fluid pressures in the cavities 40 and 45 act on opposite ends of the valve element 36, and produce a net fluid pressure force of the valve element 36. When the net fluid pressure force on the valve element 36 exceeds the force of the biasing spring 43, the valve element 36 will move away from the priority position (i.e., rightwardly from the positioning FIG. 3). As it moves away from the priority position, the valve element 36 will (i) gradually decrease communication between the inlet 38 and the priority outlet cavity 40 and (ii) establish and gradually increase communication between the inlet 38 and the auxiliary cavity 44. In the priority valve 28, a relief valve 35 operates to relieve excess fluid pressure in spring cavity 45 to the reservoir 26.

The fluid which is directed by the priority valve 28 to the steering circuit 17 is directed along two different paths to the steering controller 16. A main fluid conduit 57 communicates fluid from the priority outlet port 42 to a main inlet port 50 of the steering controller. A pilot conduit system, described more fully hereinafter, directs pilot fluid to a load sense port 58 of the steering controller.

Figure 4:
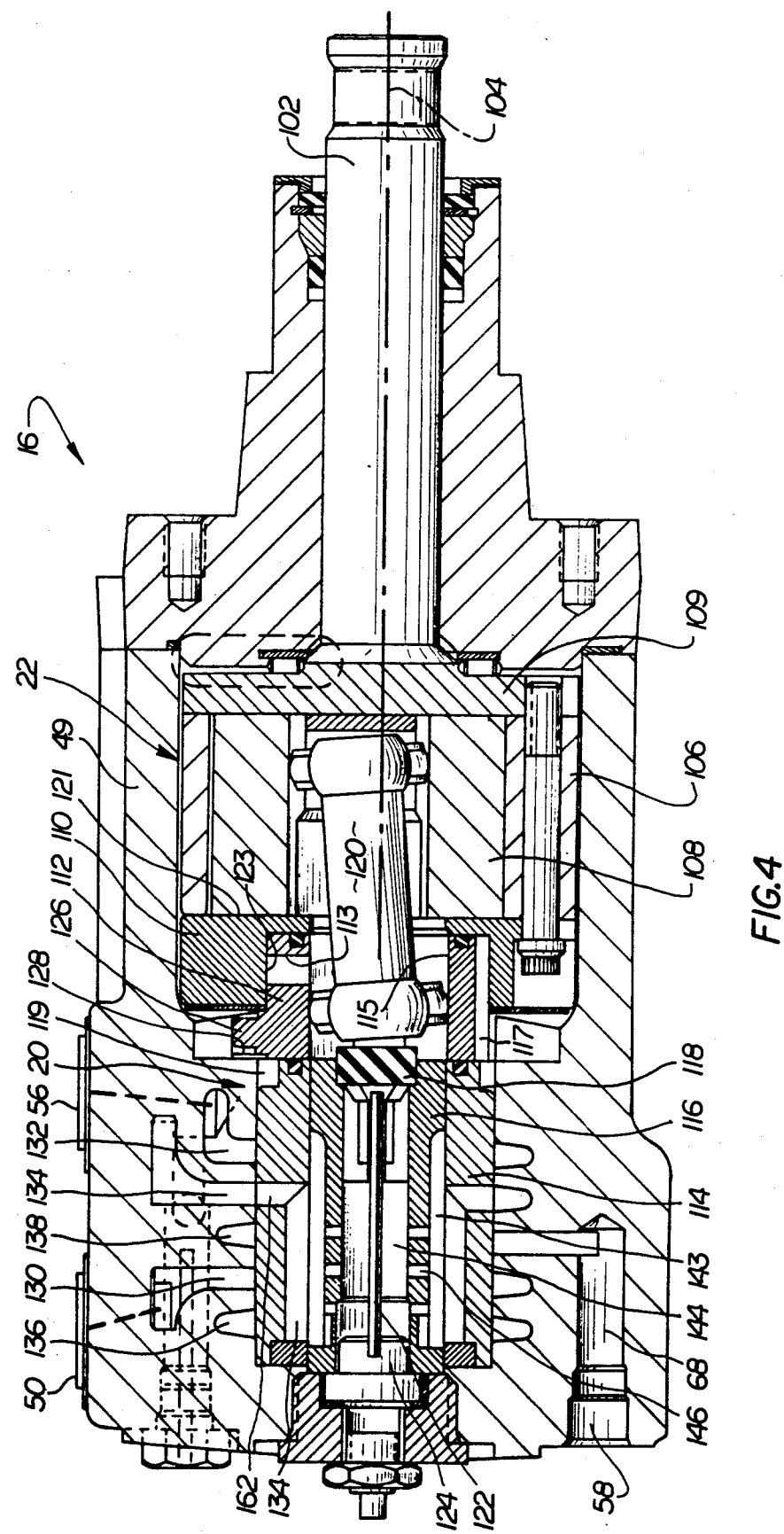
FIG. 4 is a longitudinal sectional view of a hydrostatic load sense steering controller for use in a system according to the invention.

Referring to FIG. 4, in the hydrostatic steering controller, the metering unit 22 and the control valve 20 are disposed within a housing 49. The steering controller's housing 49 includes the inlet port 50, load sense port 58, two working ports 52, 54 connected to opposite chambers of the steering motor 24, and a return port 56 connected to the reservoir 26. An input member 102, which is connected to the steering wheel 18, extends into the housing 49 and is supported for rotation about a central axis 104. The metering unit 22 and the control valve 20 are connected with the input member 102 and are operated by rotation of the input member 102 about the central axis 104.

Figure 16:
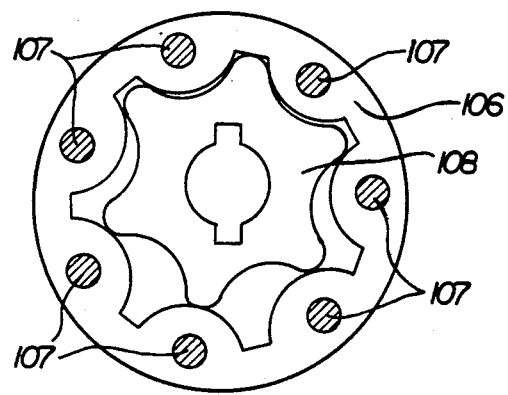
FIG. 16 is a view of the gerotor gears forming the metering unit in a controller for use in a system according to the invention.

The metering unit 22 is constructed according to the principles disclosed in U.S. Pat. No. 3,895,888. It includes a gerotor gear mechanism comprising an outer gear 106 haing a series of internal teeth, and an inner gear 108 with external teeth numbering one less than the number of teeth of the outer gear 106 (see FIG. 16). The outer gear 106 is fixed, by bolts 107, to a drive plate 109 which is fixed to the input member 102. Thus, the outer gear 106 rotates with the input member 102 about the central axis 104. The inner gear 108 is mounted eccentrically with respect to the outer gear 106, and is adapted to rotate about its central axis and to orbit relative to the outer gear 106.

The inner and outer gears 108, 106 define fluid pockets which expand and contract as the gears rotate and orbit relative to each other. A commutation valve arrangement controls flow to and from the expansible and contractible pockets in timed relation to the relative rotational and orbital movement of the gears. In accordance with the principles of U.S. Pat. No. 3,895,888, the commutation valve arrangement includes an outer member 110 which is bolted to and rotates with the outer gear 106, and an inner member 112 which can rotate with the inner gear 108. The outer commutator member 110 has a number of fluid passages, equal to the number of teeth in the outer gear 106. While the passages are not shown in FIG. 4, they extend from the surface 121 of the valve member which is adjacent to the gears 106, 108 to a central opening 123 formed in the outer valve member 110. The inner commutator valve member 112 has an array of fluid openings equal to twice the number of teeth on the inner gerotor gear 108. The array of fluid openings includes (i) radial openings 113 which communicate with a central opening 115 in the valve member 112 and (ii) axial openings 117 which communicate with a fluid space 119 adjacent one end of the control valve 20. The radial openings 113 and the axial openings 115 are alternately spaced about the outer periphery of the inner commutator valve member 112. Commutation valving occurs at the interface of the commutator valve members 110, 112, when the valve members rotate relative to each other.

The control valve 20 includes a part of the housing 49, a valve sleeve 114 which is fixed in the housing, and a rotatable control valve spool 116. The rotatable spool 116 is connected with the inner commutator valve member 112 (through an element 118), so that the spool 116 and the inner commutator valve member 116 can rotate jointly. An angular drive link 120 couples the inner gerotor gear 108 for joint rotation with the inner commutator valve member 112, thus also coupling the inner gerotor gear 108 for joint rotation with the rotatable control valve spool 116.

A longitudinally extending torsion spring 122 biases the rotatable control valve spool 116 to a neutral position. The torsion spring 122 has a first end connected to the rotatable control valve spool 116 and a second end connected to a plug 124 which is fixed in the housing 49. Preferably, the torsion spring 122 comprises a pair of blades constructed according to the principles of U.S. Pat. No. 3,918,856.

The controller has a "closed-center" mode of operation, in terms of the way it utilizes fluid from the inlet port 50 to operate the steering motor 24. Specifically, when the control valve spool 116 is in its neutral position (FIG. 1), it blocks fluid flow from the controller's inlet port 50 to the metering unit 22. Also, when the control valve spool 116 is in its neutral position, the metering unit is in a "lock-up" condition in which the gerotor gears 106, 108 can rotate jointly, but the inner gear 108 cannot orbit. When an operator turns the steering wheel 18, and the metering unit is in a "lock-up" condition, it transmits a force to the control valve spool 116 which rotates the control valve spool 116 away from the neutral position, in accordance with the principles of U.S. Pat. No. 3,895,888. After the control valve spool 116 rotates a predetermined distance away from the neutral position it reaches an operating condition in which it (i) establishes a main flow control orifice 60 (FIG. 2) which communicates the inlet port 50 with one side of the metering unit 22, (ii) communicates the other side of the metering unit 22 with one chamber of the steering motor 24, and (iii) communicates the other chamber of the steering motor 24 with the reservoir 26.

When an operator steers, and the control valve spool 116 has moved to an operating condition, the inner gear member 108 of the metering can orbit as the outer gear 106 rotates, in order to meter fluid. The control valve spool 116 directs the metered fluid to the steering motor 24 to operate the steering motor 24. When metered fluid is being directed to the motor 24, a fluid reaction force from the steering motor (i.e., the steering load) is applied to the metering unit, and the fluid which is directed to the metering unit assists the metering unit in overcoming the steering load to effect steering. When the amount of fluid being directed to the metering unit is approximately the same as the amount of metered fluid being directed to the steering motor 24, and the metering unit is operating in a mode in which the inner gear 108 only orbits as the outer gear 106 rotates, the steering circuit 117 is in a condition in which the steering demand is being satisfied. When the amount of fluid directed to the metering unit is not sufficient to enable the inner gear 108 to orbit only, the metering unit will again be in a "lock-up" condition, and will cause the control valve spool 116 to move further away from its neutral position, to increase the area of the main flow control orifice 60 communicating the inlet port 50 with the metering unit. Additional fluid will be directed from the inlet port 50 to the metering unit 22 to help the system satisfy the steering demand.

Thus, when an operator steers, if the metering unit is not receiving sufficient fluid to enable it to reach a condition in which the steering demand is being satisfied, it will be in its "lock-up" condition, and the control valve spool 116 will move further from its neutral position until either (i) the system reaches a steady-state condition in which the steering demand is being satisfied or (ii) the control valve spool 116 moves to the limit of its range of movement away from the neutral position. At a predetermined high steering demand, the control valve spool reactes the limit of its range of travel away from the neutral position. In that position (FIG. 3), the flow area of orifice 60 is a maximum. In the controller of FIG. 4, the control valve spool's range of movement, relative to the neutral position, is defined by a lug 126 which is carried on the inner commutator valve element 112, and which can move to a limited extent in a slot 128 formed in the housing.

If during steering, there is a reduction in the operator's demand and/or steering load, then the control valve spool 116 will shift back toward its neutral position under (i) the influence of the torsion spring 122 and (ii) the follow-up action of the metering unit 22. If steering effort ceases, the control valve spool 116 will return to its neutral position.

As discussed above, the position of the priority valve 28 and the displacement of the pump 10 are regulated by fluid pressures in a pilot conduit system. The pilot conduit system originates in the priority valve 28, and communicates with the load sense port 58 of the steering controller 16. Referring to FIGS. 1-3, a first pilot conduit 46 branches from the priority outlet cavity 40 of the priority valve. It communicates, through a fixed area orifice 48, with a conduit 59 leading to the load sense port 58 of the steering controller. A second pilot conduit 62 also branches from the priority outlet cavity 40. It communicates with the priority valve's spring cavity 45 through a fixed area orifice 64. The spring cavity 45 communicates, in turn, with the conduit 59, through another fixed area orifice 66. Thus, as seen from FIG. 1, the pilot circuit extending between the priority outlet cavity 40 and the conduit 59 includes a pair of pilot conduits 46 and 62 which are in parallel with each other.

In the controller 16, when the control valve spool 116 is in its neutral position, it directs pilot fluid from the load sense port 58 to the reservoir 26 (see FIG. 1). The pilot fluid is directed to the reservoir 26 through (i) a first fixed area orifice 68 and (ii) a second variable area orifice 70 formed partially by the control valve spool 116. When the control valve 20 is in its neutral position, the variable area orifice 70 has its maximum flow area.

According to the principles of the invention, when there is no steering, and the control valve spool 116 is in its neutral position (FIG. 1), the pump 10 will be in an intermediate displacement which is (i) above its minimum displacement condition (21 in FIG. 1) and (ii) below its maximum displacement condition. Further, the priority valve element 36 will be in a position in which it maintains a certain pilot flow (i.e. about 1 gal/min) in the pilot circuit. Specifically, in the pilot circuit, the orifice 48 is relatively large in area, and the bulk of the pilot flow is directed through the orifice. The series arrangement of orifices 64 and 66 directs a small portion of the pilot flow through the spring cavity 45 of the priority valve 28. The pilot orifice system (orifices 48, 64, 66, 68, 70) is specifically sized, in relation to (i) the biasing spring 43 acting on the priority valve 36, (ii) the spring 88 which biases the flow compensator valve 86, and (iii) the spring 76 which biases the swash plate 72, so that when there is no steering the system can come to a steady-state standby condition in which a predetermined pilot flow (e.g. 1 gal/min) will be directed through the control valve spool 116 and to the reservoir 26. The pilot orifice system is designed so that the system cannot come to a steady-state condition when there is no steering until the predetermined pilot flow is being directed to the reservoir. Additionally, it should be noted that the fixed area orifice 68 performs a stabilizing function, to minimize the effect of unintended pressure fluctuations in the pilot conduit 59 on the controller 16.

According to the invention, the relatively high pilot flow will cause the pressure in cavity 80 to be lower when the system comes to a steady-state cnndition than it would be if the pilot flow were at a minimum level (e.g., 0.25 gal/min.). Thus, when the system comes to a steady-state standby condition, the displacement of the pump 10 will be higher than it would be if the pilot flow being directed through the control valve spool 116 and to the reservoir 26 were at a minimum level.

With the invention, the steady-state standby pilot fluid flow directed through the controller to the reservoir is sufficient to perform same low demand steering maneuvers (e.g., the operator steers gradually). For low demand steering maneuvers, the steering system can operate in an "open-center" mode, utilizing the pilot fluid alone to satisfy the steering demand. The pilot fluid flow is not large enough to handle higher steering demands, and the steering controller maintains its "closed center" mode of operation in handling higher steering demands, as discussed more fully hereinafter.

When the system is in standby, it produces hydraulic biasing forces on both the pump control mechanism, and on the priority valve element 36. The biasing forces help the pump and/or the priority valve responds quickly to a sudden high steering demand. Specifically, when the system is in standby, the pump 10 will be "primed" to a displacement above its minimum displacement, and a moment M (FIG. 1) will be produced on the swash plate 72. As seen from FIG. 1, the moment assists the spring 76 in overcoming the inertia of the actuator 78, if there is a need to increase the pump's displacement further. Also, there will be an increased hydraulic pressure force acting on the priority valve element 36, and assisting the spring 43 in biasing the valve element toward its priority position.

Figure 2A:
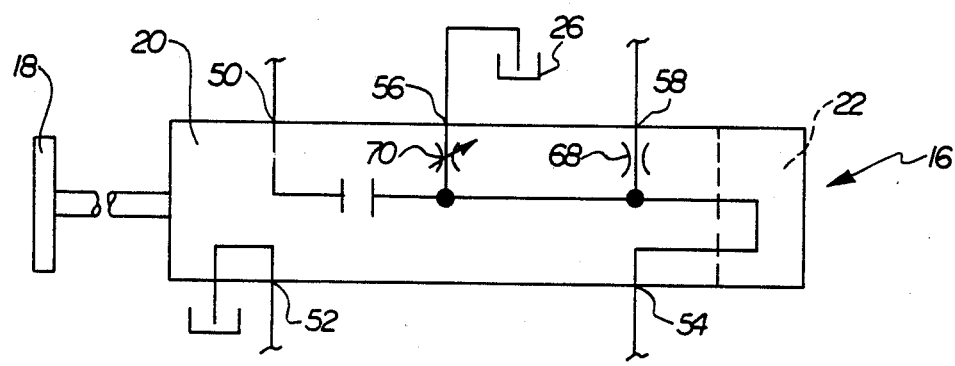
FIG. 2A is a fragmentary view of the system of FIG. 2, showing the flow in the steering controller upon initiation of steering, where there is a small demand for flow and pressure for steering, the steering control valve is in its operating range, and the pilot fluid is sufficient to satisfy the steering demand.

During steering, as the control valve spool 116 moves away from its neutral position and toward its operating condition, it also begins (i) restricting pilot flow to the reservoir 26 and (ii) directing pilot fluid to the metering unit 22 (FIG. 2). The rate at which the flow of pilot fluid to the reservoir 26 is restricted, and the flow to the metering unit 22 increased, is correlated to the flow controlling components of the system so that over at least part of the operating range of the control valve spool 116, the pilot fluid alone may be able to satisfy the steering demand. Specifically, the flow of pilot fluid to the reservoir is restricted by orifice 70 at a rate such that if the control valve spool 116 is operating over an initial part of its operating range, the amount of pilot fluid being directed to the metering unit 22 may equal the rate at which metered fluid is being directed to the steering motor. Thus, flow via control orifice 60 is not required, and there may not be any flow through it, as shown schematically in FIG. 2A. The system will still be operating "closed center" as to the fluid communicated to the inlet port 50, because there is no flow through the inlet port. The orifice 70 and the priority valve element 36 can modulate flow and pressure in the pilot circuit, so that the pump's displacement will remain essentially unchanged.

As the control valve spool 116 moves through the remainder of its operating range, indicating a higher steering demand, there will be flow through the main flow control orifice 60 to the metering unit, and the pressure at the load sense port 58 will vary directly in accordance with variations in the flow through the main flow orifice 60. As the flow area of the orifice 60 varies, it will vary the pressure signal at the load sense port 58. The displacement of the pump and/or the position of the priority valve will change, as necessary, in order to try to bring the system to a steady-state condition in which the fluid being directed to the metering unit is sufficient to effect steering as demanded by the operator.

During steering, as the steering demand increases and the control valve spool 116 moves further away from its neutral position, there will be an increased pressure in the pilot conduit 59. The increased pressure will increase the pressure fluid force which acts on the priority valve element 36 together with the force of biasing spring 43 and biases the priority valve element 36 toward its priority position. The increased pressure will require the system pressure to elevate to a higher level before it can shift the priority valve element 36 away from its priority position. Also, the increased pressure in the pilot conduit 59 will be transmitted to the spring cavity 92 of the flow compensator valve 82, so that the pressure in the cavity 92 reflects the demand condition of the steering circuit.

If there is a high steering demand (i.e., rapid operator steering and/or a sudden high steering load), the control valve spool 116 moves rapidly away from its neutral position, and abruptly closes the pilot orifice 70. Closing the pilot orifice creates a pressure surge in the pilot conduit 59. This surge is controlled by the rate at which the flow of pilot fluid is restricted, and the rate at which flow through the metering unit 22 and to the steering motor is increased. This, the valve timing should be such that the surge will be primarily provided in the conduit 59, and will not be unduly dissipated by connection to the load. With proper timing the pressure surge generated in the conduit 59 rapidly drives the priority valve element 36 toward its priority position to insure priority flow for steering. The pressure surge will also rapidly drives the flow compensator valve to the position shown in FIG. 3. The fluid cavity 80 is vented to the reservoir 26, and the combination of the spring 76 and the biasing moment M drives the swash plate 72 in a direction which rapidly increases the pump's displacement.

Figure 5:
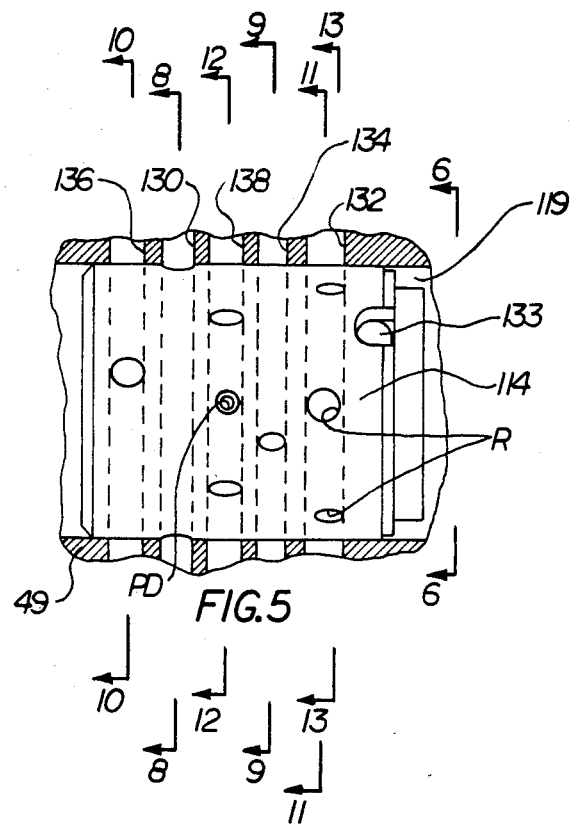
FIG. 5 is a fragmentary sectional view of a portion of the controller of FIG. 4, showing a side elevational view of a sleeve valve member in the controller.
Figure 7:
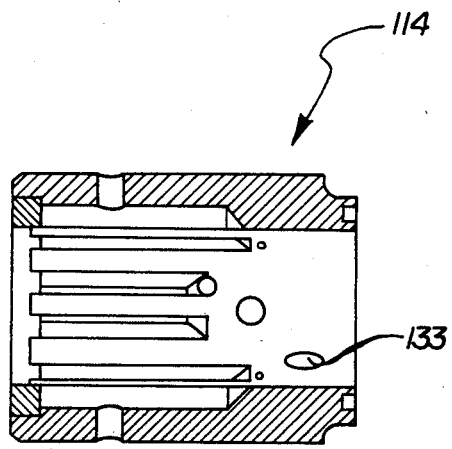
FIG. 7 is a sectional view of the sleeve valve member of FIG. 6 taken along the section line 7—7 of FIG. 6.
Figure 8:
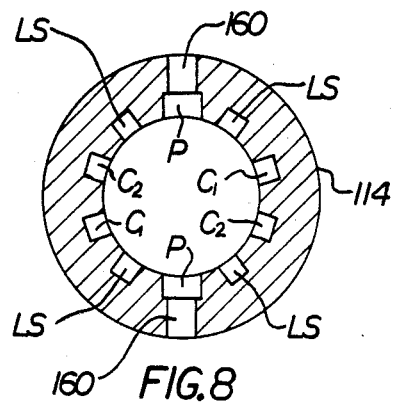
FIGS. 8 through 13 are sectional views of the sleeve valve member of FIG. 5 taken respectively along the sectional lines 8—8, 9—9, 10—10, 11—11, 12—12, and 13—13 of FIG. 5.
Figure 9:
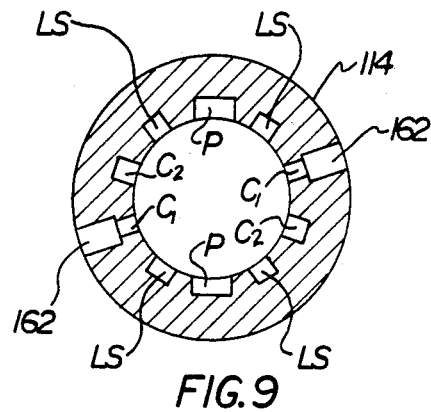
Figure 10:
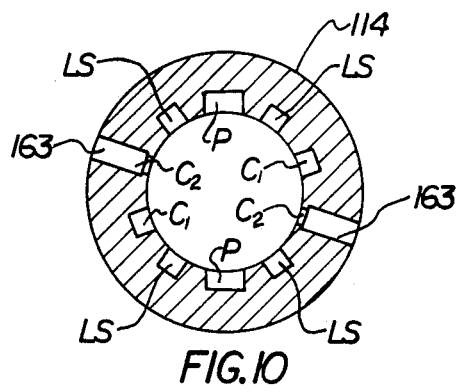
Figure 11:
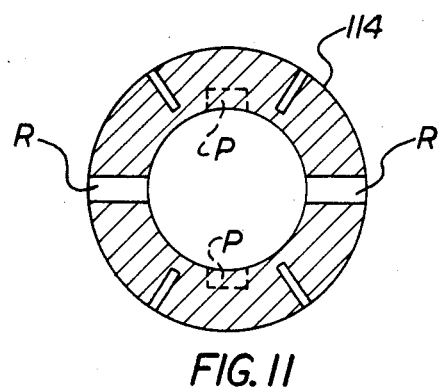
Figure 6:
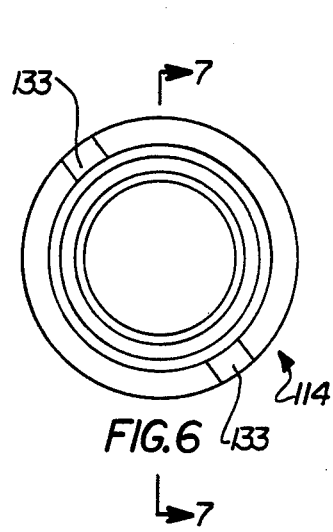
FIG. 6 is an end view of the sleeve valve member of FIG. 5 taken from the direction 6—6 of FIG. 5.
Figure 12:
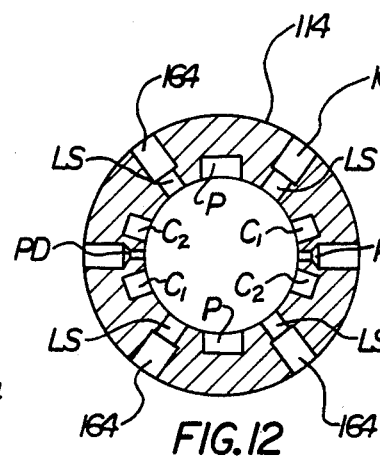
Figure 13:
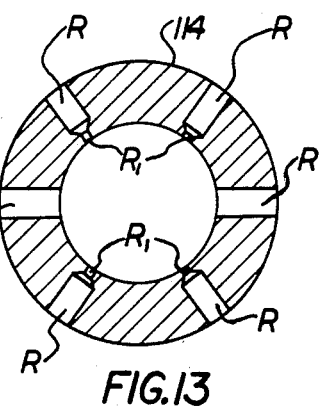
Figure 14:
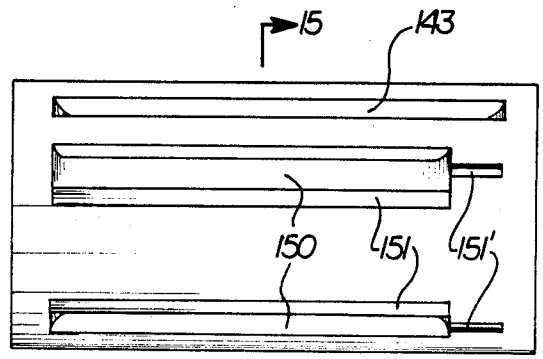
FIG. 14 is a side elevational view of a rotatable spool valve member used in the controller of FIG. 4, taken from the direction 14—14 in FIG. 15.
Figure 15:
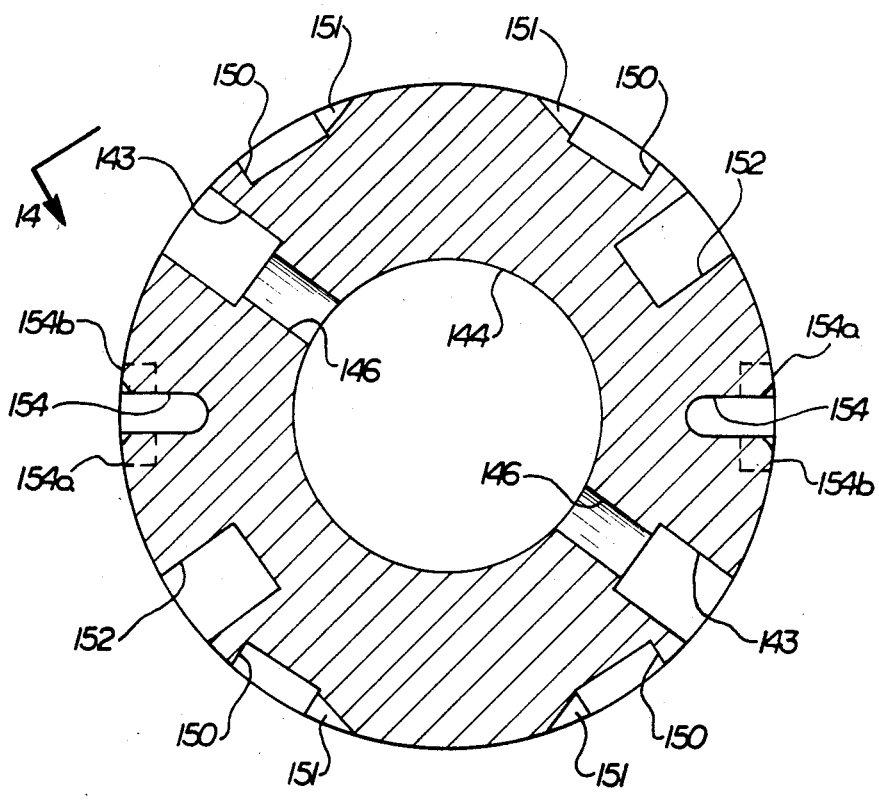
FIG. 15 is an enlarged sectional view of the spool valve member of FIG. 14 taken along the section line 15—15 of FIG. 14.
Figure 17:
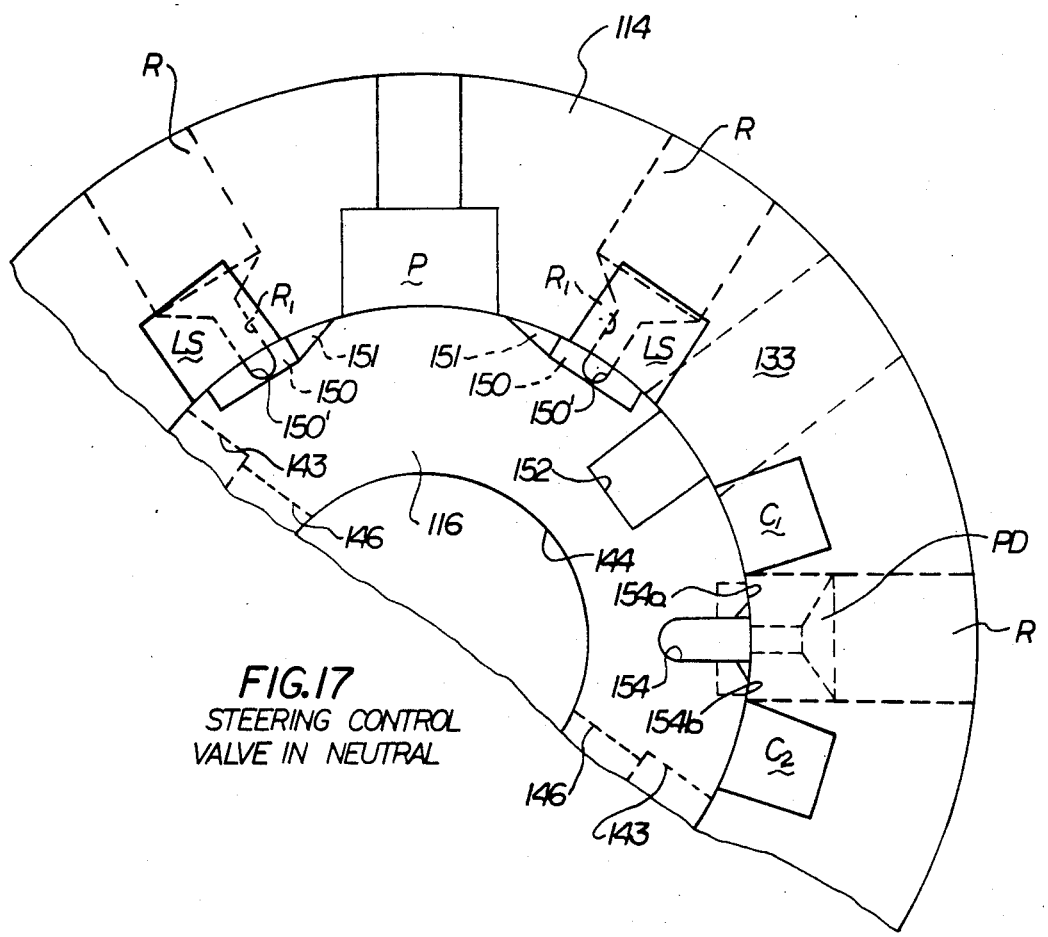
FIG. 17 is a fragmentary schematic view of a section of the control valve in the steering controller, when the system is in the condition of FIG. 1.

In the controller, the basic valving for the closed center mode of operation incorporates the principles of U.S. Pat. No. 3,895,888 and U.S. application Ser. No. 243,497, which are assigned to the assignee of this application and which are incorporated herein by reference. Specifically, the flow from the inlet port 50 to the metering unit 22 and from the metering unit 22 to the steering motor 24 is controlled by the control valve spool 116. Referring to FIGS. 4 and 5, the housing 49 includes an annular groove 130 connected with the inlet port 50, another annular groove 132 connected with the return port 56, two annular grooves 134, 136 connected to the working ports 52, 54, and an annuar groove 138 connected with the load sense port 58. The fixed valve sleeve 114 includes a series of longitudinal grooves and radial passages for directing fluid between the various ports and the metering unit. Specifically, as seen in FIG. 17, the fixed valve sleeve 114 has (i) longitudinal grooves P connected, via annular groove 130, with the inlet port 50, (ii) longitudinal grooves $C_1$, $C_2$ connected via annular grooves 134, 136, with respective working ports 52, 54, and (iii) longitudinal grooves LS connected, via annular groove 138, with the load sense port 58. Further, the fixed valve sleeve 114 and (i) passages R extending radially therethrough and connected, via annular groove 132, with the return port 56, and (ii) radial passages 133 connected to one side of the metering unit (through the fluid space 119 and the commutator valve). Finally, the fixed valve sleeve 114 includes diametrically opposed radial passages PD which are (i) spaced axially from the radial passages R shown in FIG. 5 and (ii) communicated, via the annular groove 138, with the load sense port 58.

The rotatable control valve spool 116 (FIGS. 14, 15, 17–22) includes a plurality of longitudinal grooves 143, 150, 152, 154 which extend to its outer periphery, and a longitudinally extending central passage 144 coaxial with the spool. The central passage 144 is connected to the longitudinal grooves 143 via radial passages 146 (FIG. 4). The central passage 144 is also in fluid communication with the central opening 115 in the inner commutator valve member 112. Certain of the longitudinal grooves 150 face the LS grooves in the fixed valve sleeve 114 and are blocked from communication with the inlet grooves P, when the valve spool 116 is in its neutral position (see FIG. 17). When the valve spool 116 is rotated in one direction (i.e., counterclockwise in from the position of FIG. 17), beveled longitudinally extending surfaces 151 on the grooves 150 underlap the inlet grooves P. The inlet port 50 then communicates with the metering unit through (i) the bevelled surfaces 151 and the grooves 150 in the valve spool 116, (ii) the LS grooves in fixed valve sleeve 114, (iii) longitudinal grooves 152 in the valve spool 116, (iv) the radial passages 133 in the fixed valve sleeve 114, (v) the fluid space 119, (vi) the axial openings 117 in the inner commutator valve member 112, and (vii) certain of the passages in the outer commutator valve member 110. The beveled surfaces 151 cooperate with the fixed valve sleeve 114 to form the variable area orifice 60 shown in FIGS. 2 and 3.

Also, as the valve spool 116 rotates counterclockwise from the neutral position shown in FIG. 17, one set of cylinder grooves (i.e., $C_1$) communicates with the reservoir 26 through (i) the longitudinal grooves 154 formed in the rotatable valve spool 116 and (ii) some of the radial passages R in the fixed valve member 114. The other set of cylinder grooves $C_2$ receive metered fluid via (i) certain of the passages in the outer commutator valve member 110, (ii) the radial openings 113 in the inner commutator member 112, (iii) the central opening 115 in the commutator valve member 112, (iv) the central passage 144 in the valve spool 116 and (v) the grooves 143 in the valve spool 116 which face the cylinder grooves $C_2$.

Figure 18:
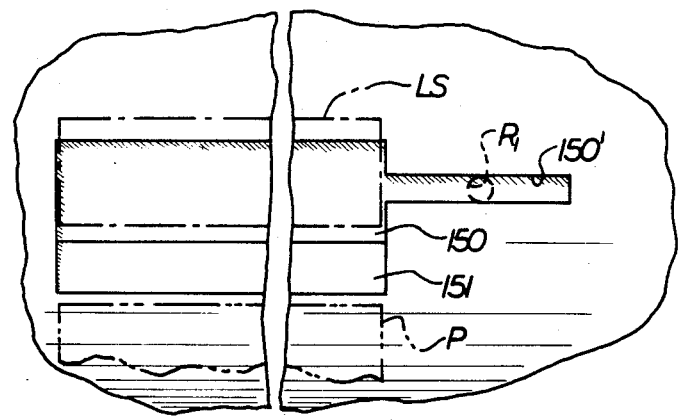
FIG. 18 is a fragmentary schematic plan view of a part of the control valve spool in the steering controller, when the control valve is in the position of FIG. 17.

When the valve spool 116 rotates counterclockwise from the position shown in FIG. 17, it moves from the position shown in FIGS. 17, 18 to the position shown in FIGS. 19, 20 and toward its operating condition. Its operating range, i.e., the range in which the orifice 60 will vary in size according to the operator's demand and the steering load, is the range of movement of the valve spool 116 between the position shown in FIGS. 19, 20 and the position shown in FIGS. 21, 22. When the valve spool 116 moves through its full operating range, it will be in the position shown in FIGS. 21, 22. In position of FIGS. 21, 22, the flow area of orifice 60 (i.e., the flow area from grooves P, across bevelled surfaces 151 and to the metering unit) is at a maximum value.

Additionally, in accordance with the principles taught by U.S. Pat. No. 4,311,171, and the further principles taught by U.S. application Ser. No. 243,497, when the control valve spool 116 moves to the limit of its operating range (FIG. 22), pressure dams will be created to block leakage of metered fluid to the reservoir 26. Specifically, the longitudinal grooves 154 in the valve spool are continuously communicated with the reservoir 26. Up until the valve spool 116 moves to the limit of its operating range, there is flow through the radial PD passages to the reservoir 26, since the PD passages are underlapped by the return grooves 154 in the control valve spool 116 (see FIGS. 17-20). However, when the control valve spool 116 reaches the limit of its operating range (FIGS. 21, 22), surfaces 154a or 154b on the outer periphery of the valve spool 116 will block flow through the PD passages. The PD passages, which are communicated with the load sense port 58, will come to a pressure which is at, or close to, the pressure of the metered fluid being directed through one set of cylinder grooves ($C_1$ or $C_2$) to the steering motor 24. That pressure will restrict leakage of metered fluid from the one set of cylinder grooves to the other cylinder grooves which are returning fluid from the steering motor 24 to the reservoir 26.

If the valve spool 116 shifts clockwise from the position of FIG. 17, then the valving of fluid is by similar principles, but the flow through the metering unit is reversed. The fluid from the inlet grooves P is directed to the metering unit via (i) grooves 143, (ii) radial passages 146, and (iii) central passage 144 in the movable valve spool 116. Metered fluid is directed to the cylinder grooves $C_1$ via (i) radial passages 133 in the valve sleeve 114, and (ii) longitudinal grooves 152 in the valve spool 116.

In accordance with the invention, the control valve spool 116 (i) directs the pilot flow of fluid to the return port 26 when the control valve spool 116 is in the neutral position, and (ii) restricts the flow of pilot fluid to the reservoir 26 as the control valve spool 116 moves toward its operating condition and over a portion of its operating range. Specifically, the longitudinal grooves 150 have axially projecting narrow longitudinal extensions 150' (see FIGS. 18, 20, 22). Also, the load sense port 58 is continuously communicated with the LS grooves in the fixed valve sleeve 114 through the fixed area orifice 68 (shown in FIGS. 1-4). Certain of the radial passages R in the fixed valve sleeve 114 have restricted outlets $R_1$ which are communicated with the narrow extensions 150' when the valve spool 116 is in its neutral condition (FIGS. 17, 18). Thus, when the valve spool 116 is in its neutral condition, there is flow from the LS grooves, through the longitudinal extensions 150' and the restricted outlets $R_1$, to the reservoir 26. The longitudinal extensions 150' and the restricted outlets $R_1$ form the orifice 70 shown schematically in FIGS. 1, 2.

When the valve spool 116 rotates counterclockwise from the position shown in FIG. 17, the longitudinal extensions 150' move relative to the restricted outlets $R_1$ and the flow of pilot fluid to the reservoir 26 is restricted. At the point where the control valve spool 116 reaches its operating condition (FIG. 19), the amount of restriction is significant, and causes a pressure increase in the pilot conduit 59. Also, when the control valve spool 116 reaches an operating condition, the LS grooves are connected to the intake side of the metering unit, so that pilot fluid which is not directed to the reservoir is now directed to the metering unit.

Figure 21:
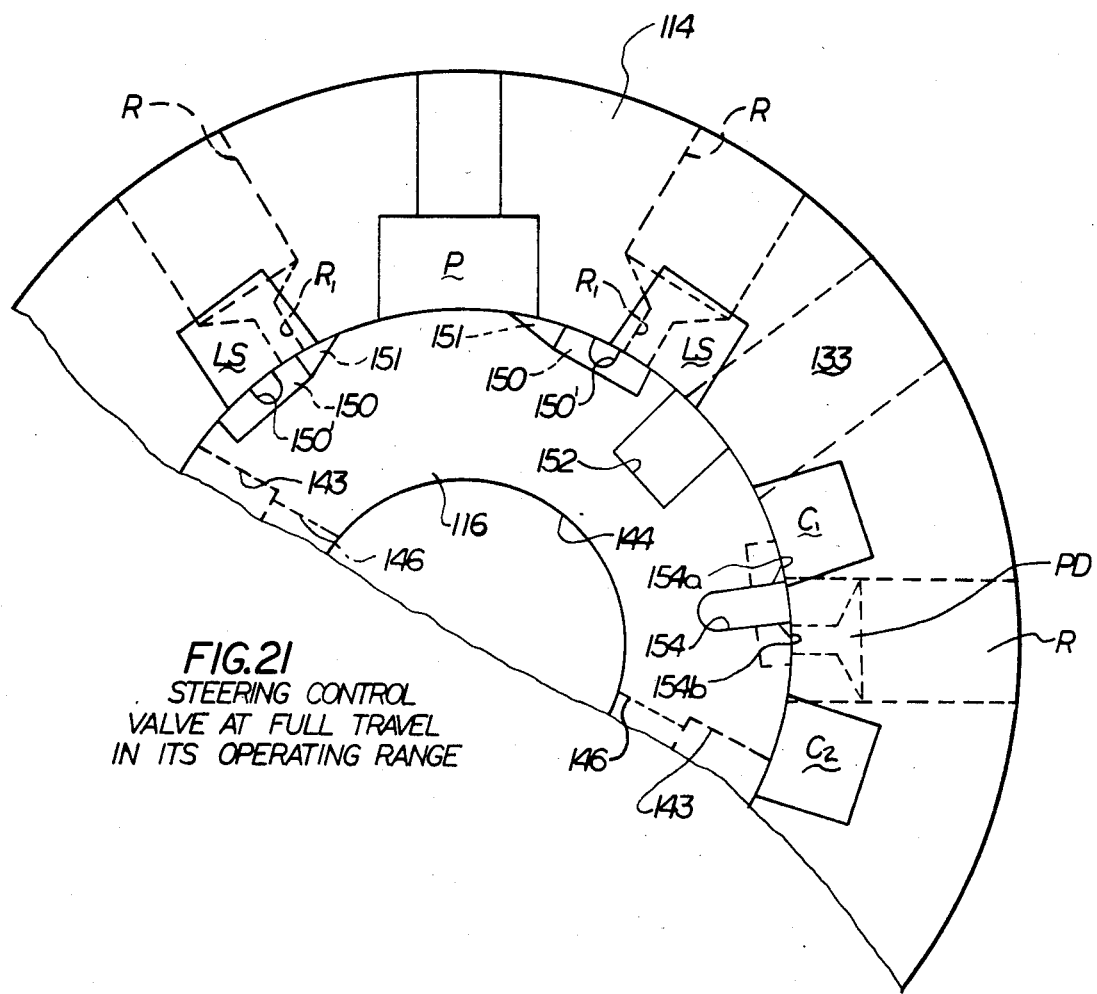
FIG. 21 is a fragmentary schematic view of a section of the control valve in the steering controller, when the system is in the condition of FIG. 3.
Figure 22:
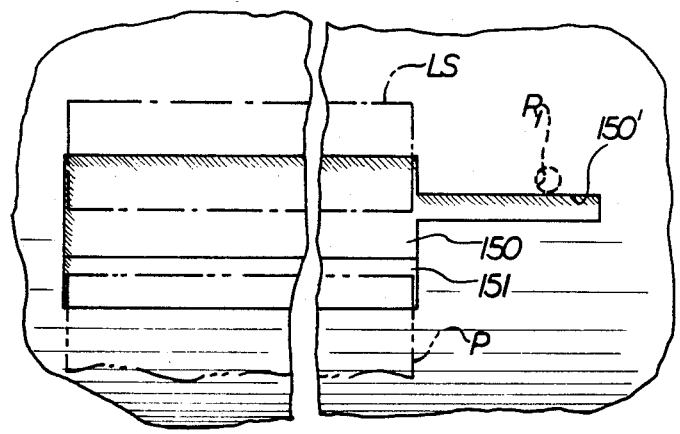
FIG. 22 is a fragmentary schematic plan view of a part of the control valve spool in the steering controller, when the control valve is in the position of FIG. 21.

As the steering demand increases, the valve spool 116 moves farther from its neutral position. As it moves farther from the neutral position, the communication between the narrow extensions 150' and the restricted outlets $R_1$ decreases, thus further increasing the pressure in the LS cavity and thereby in the pilot conduit 59. According to the preferred embodiment, the valving is designed so that communication between the narrow extensions 150' and the restricted outlets $R_1$ will begin closing when the control valve spool 116 initially moves away from its neutral position and will increasingly close as the valve spool 116 moves through at least part of its operating range. When the control valve spool 116 has moved through its full operating range, the communication between the narrow extensions 150' and the restricted outlets $R_1$ will be completely closed (FIGS. 21, 22).

If the operator makes a very abrupt steering maneuver, thus making a very high demand for fluid flow and pressure, the communication between the narrow extensions 150' and the restricted openings $R_1$ will rapidly close, providing a pressure surge in the pilot conduit 59. The pressure surge will be transmitted to the spring cavity 45 of the priority valve and to the spring cavity 92 of the flow compensator valve 82. It will rapidly urge the priority valve element 36 toward its priority position, and will rapidly urge the flow compensator valve element 86 toward a position in which the fluid chamber 80 is vented to the reservoir. The hydraulic moment M which is already acting on the swash plate 72 due to the relatively high pilot flow will assist the spring 76 in rapidly urging the swash plate 72 toward the maximum displacement position for the pump. Thus, the system will respond rapidly to such a steering demand.

Finally, according to the preferred embodiment, the flow of pilot fluid in conduit 59 may be augmented by a pilot fluid signal from the auxiliary circuit 30, in accordance with the principles of U.S. application Ser. No. 345,546, now U.S. Pat. No. 4,454,716, which is assigned to the assignee of this invention and which is incorporated herein by reference. Specifically, the auxiliary circuit 30 may include one or more load sense valves which can produce a pressure signal in an auxiliary load sense conduit 169 when there is a need for additional fluid in the auxiliary circuit 30. The load sense signal from the auxiliary circuit is communicated from the auxiliary conduit 169 through a check valve 173 and to the spring cavity 92 of the flow compensator valve 82, so that the pressure in the spring cavity 92 reflects the auxiliary circuit's need for fluid. Thus, when there is a need for flow in the auxiliary circuit 30 the flow compensator valve 82 can cause the pump displacement to vary accordingly. Also an auxiliary pilot orifice 170 connects the auxiliary load sense conduit 169 to the pilot conduit 59, and forms a common bleed orifice for the auxiliary circuit, as discussed in application Ser. No. 345,546 now U.S. Pat. No. 4,454,716. Additionally, there is a one-way check valve 172 which communicates the pilot conduit 59 with the spring cavity 92 of the flow compensator valve 82. As disclosed in U.S. application Ser. No. 345,546, now U.S. Pat. No. 4,454,716, the arrangement of orifice 170 and check valve 172 has the effect of increasing the pressure in the pilot conduit system when an auxiliary device is operating and improving the speed with which the system can react to a steering effort when an auxiliary device is operating. Also, by relocating the orifice 170 and check valve assembly 172 so that it connects to the conduit 59 at a location downstream of the parallel pilot conduits 46, 62, it may be possible to eliminate the stabilizing orifice 68 in the controller 16.

What is claimed is:

1. A hydrostatic steering system for operating a vehicle steering motor comprising a source of fluid, a hydrostatic steering controller having an inlet port, a load sense port, a metering unit, and a control valve, a main fluid circuit communicating fluid from said source to the inlet port of the controller, a pilot fluid circuit for directing pilot fluid from said source to the load sense port of the controller, and means responsive to fluid pressure in the pilot fluid circuit for controlling fluid flow in the main fluid circuit to the inlet port of the controller, said control valve having a neutral position and being movable away from said neutral position in accordance with an operator's demand and a steering load for directing and controlling fluid flow from the inlet port and the load sense port to the metering unit and from the metering unit to the steering motor, the control valve directing pilot fluid from the load sense port to a reservoir when the control valve is in its neutral position and communicating pilot fluid from the load sense port to the metering unit as the control valve moves away from its neutral position, said metering unit being operable at a rate which corresponds to the operator's demand and the steering load when the rate of fluid being directed to the metering unit equals the rate at which metered fluid is being directed to the steering motor, the pilot fluid circuit directing sufficient pilot fluid to the load sense port for the metering unit to operate at a rate which corresponds to the operator's demand and the steering load over a range of operator demands and steering loads, said control valve, when in said neutral position, blocking fluid at said inlet port of said hydrostatic steering controller, said control valve being biased to said neutral position and, in response to rotation of the vehicle's steering wheel, being movable away from said neutral position and to an operating condition in which it establishes a main flow control orifice communicating said inlet port with said metering unit, said control valve as it moves away from said neutral position restricting the flow of pilot fluid to the reservoir and communicating pilot fluid to the metering unit at a rate such that the pilot fluid directed to the metering unit is sufficient for the metering unit to operate at a rate which corresponds to the operator's demand and the steering load over said range of operator demands and steering loads, said source including a variable displacement pump having an outlet, said pilot fluid circuit including a main pilot conduit communicating with the load sense port of the controller, and first and second branch pilot conduits, and said means responsive to fluid pressure in the pilot fluid circuit including actuator means for controlling the displacement of the pump, a flow compensator valve for effecting operation of the actuator means, and a priority valve which communicates fluid from the pump to the inlet port of the controller, said priority valve including an inlet communicating with the source, a priority outlet communicating with the inlet port of the hydrostatic steering controller, an auxiliary outlet, a pilot outlet connected to the main pilot conduit, a priority valve element for controlling a flow of fluid communicated to the inlet port of the controller, first biasing means biasing the priority valve element to a priority position in which it communicates the inlet with the priority outlet and blocks communication between the inlet and the auxiliary outlet, and means defining a pilot fluid pressure cavity at one end of the valve element so that fluid in said cavity produces a fluid pressure force acting on the valve element, the priority outlet of the priority valve being communicated with the other end of the priority valve element, the priority valve element being movable away from its priority position when fluid pressure force on said other end of the priority valve element exceeds the force of the first biasing means and the fluid pressure force on said one end of the valve element, the priority valve element as it moves away from its priority position (i) gradually restricting communication between the inlet and the priority outlet and (ii) establishing and gradually increasing communication between the inlet and the auxiliary outlet, said first branch pilot conduit branching from the priority outlet of the priority valve and directing pilot fluid through the pilot fluid pressure cavity to the pilot outlet, the first branch pilot conduit including a first orifice located between the priority outlet and the pilot fluid pressure cavity and a second orifice located between the pilot fluid pressure cavity and the pilot outlet, said second branch pilot conduit branching from the priority outlet of the priority valve in parallel with the first branch pilot conduit and directing additional pilot fluid from the priority outlet to the main pilot conduit, said actuator means including second biasing means urging the actuator means to a maximum displacement position and fluid actuated means for opposing the second biasing means, said flow compensator valve including a flow compensator valve element, third biasing means for biasing the flow compensator valve element to a first position in which the displacement of the pump is at a maximum value, and means defining pressure cavities at opposite ends of the flow compensator valve element, the outlet of the pump communicating with the pressure cavity at one end of the flow compensator valve element and fluid pressure in the main pilot circuit being communicated to the pressure cavity at the other end of the flow compensator valve element, said flow compensator valve element being movable away from its first position when a net fluid pressure force on the element exceeds the force of said third biasing means, said flow compensator valve element when moved away from its first position communicating fluid from the fluid pressure cavity at said one end of said flow compensator valve element to the fluid actuated means which opposes the second biasing means, thereby to reduce the displacement of the pump.

2. A hydrostatic steering system for operating a vehicle steering motor comprising;

(a) a fluid source which delivers fluid for operating the steering motor, (b) a hydrostatic steering controller having a rotatable input member, an inlet port for receiving fluid from the source, an outlet port for directing fluid to a reservoir, a working port for directing fluid to the steering motor, and a load sense port, said hydrostatic steering controller having a metering unit, and a control valve which is biased to a neutral position in which it blocks fluid flow from the source to the steering motor, the control valve and the metering unit being connected with the input member in such a manner that upon rotation of the input member the control valve moves away from its neutral position to an operating position in which it (i) directs fluid from the source to the metering unit and (ii) directs metered fluid from the metering unit to the steering motor, the metering unit being operable at a rate which corresponds to an operator's demand and a steering load when the rate of fluid being directed from the source to the metering unit corresponds to the rate of metered fluid being directed to the steering motor, the control valve, after an initial range of movement away from its neutral position and toward its operating position, establishing a main flow control orifice communicating the inlet port with the metering unit, said control valve having a further range of movement away from its neutral position in which it increases the flow area of the main flow control orifice when there is an increasing need to direct more fluid to the metering unit to enable the metering unit to operate at a rate corresponding to the operator's demand and the steering load, (c) fluid actuator means for controlling the flow of fluid delivered from the source to the controller, (d) means biasing said fluid actuator means to a condition in which the source delivers maximum fluid flow and pressure to the inlet port of the steering controller for operating said steering motor, the fluid actuator means being movable against the bias of said biasing means to reduce the fluid flow and pressure directed to the controller when a fluid pressure force exerted on the actuator means exceeds a force exerted by the biasing means, and (e) a pilot fluid circuit which branches from the fluid delivered from the source to the inlet port of the steering controller and communicates pilot fluid with the load sense port of the controller, the control valve directing the pilot fluid from the load sense port to the reservoir when the control valve is in its neutral position, the pilot fluid circuit controlling the fluid pressure force acting on said fluid actuator means so that when the control valve is in its neutral position the flow and pressure delivered from the source to the steering controller is reduced to a standby level at which the pilot fluid being directed to the reservoir is sufficient for the metering unit operate at a rate which corresponds to the operator's demand and the steering load over a range of operator demands and steering loads, said steering control valve (i) restricting the flow of pilot fluid to the reservoir and communicating pilot fluid from said load sense port to the metering unit during movement of said steering control valve through its initial range of movement away from its neutral position and through at least part of its further range of movement away from its neutral position and (ii) directing fluid from the pilot circuit to the metering unit at a rate sufficient for the metering unit to operate at a rate which corresponds to the operator's demand and the steering load over the range of operator demands and steering loads, said source including a variable displacement pump having an outlet, said pilot fluid circuit including first and second branch pilot conduits which branch from the fluid delivered from the source to the inlet port of the steering controller and a main pilot conduit which communicates with the first and second branch conduits and with the load sense port of the steering controller, said fluid-actuator means comprising an actuator means for controlling the displacement of the pump, a flow compensator valve for controlling the displacement of said pump and a priority valve which communicates fluid from the outlet of the pump to the inlet port of the hydrostatic steering controller, said priority valve including an inlet communicating with the source, a priority outlet communicating with the inlet port of the hydrostatic steering controller, an auxiliary outlet, and a pilot outlet connected to the main pilot conduit, a priority valve element for controlling the fluid communicated with the inlet of the priority valve, first biasing means for biasing said priority valve element to a priority position in which it communicates the inlet with the priority outlet and blocks communication between the inlet and the auxiliary outlet, and means defining a pilot fluid pressure cavity at one end of the valve element so that fluid in said cavity produces a fluid pressure force acting on the valve element, the priority outlet of the priority valve being communicated with the other end of the priority valve element, the priority valve element being movable away from said priority position when fluid pressure force on said other end of the priority valve element exceeds the force of the first biasing means and the fluid pressure force on said one end of the valve element, the priority valve element as it moves away from said neutral position (i) gradually restricting communication between said inlet and the priority outlet and (ii) establishing and gradually increasing communication between said inlet and the auxiliary outlet, said first branch pilot conduit branching from the priority outlet of the priority valve and directing pilot fluid through the pilot fluid pressure cavity to the pilot outlet, the first branch pilot conduit including a first orifice located between said priority outlet and said second fluid pressure cavity and a second orifice located between said second fluid pressure cavity and said pilot port, said second branch pilot conduit branching from the priority outlet of the priority valve in parallel with the first branch pilot conduit and directing additional pilot fluid from said priority outlet to the main pilot conduit, said actuator means including second biasing means urging the actuator means to a maximum displacement position and fluid actuated means for opposing the second biasing means, said flow compensator valve including a flow compensator valve element, third biasing means for biasing said flow compensator valve element to a first position in which the displacement of the pump is a maximum value, and means defining pressure cavities at the opposite ends of said flow compensator valve element, the outlet of the pump communicating with the pressure cavity at one end of said flow compensator valve element and the pressure in the main pilot conduit being communicated to the pressure cavity at the other end of said flow compensator valve element, said flow compensator valve being movable away from its first position when a net fluid pressure force thereon exceeds the force of said third biasing means, said flow compensator valve element when moved to its first position communicating fluid from fluid pressure cavity at said one end of said flow compensator valve element to the fluid actuated means which opposes the second biasing means, thereby to reduce the displacement of the pump.

3. A hydrostatic steering system as defined in claim 2 wherein said control valve establishes a main flow control orifice for communicating fluid from said inlet port to said metering unit when said control valve is in its operating condition, said control valve progressively restricting the flow of pilot fluid to the reservoir as it moves through said initial range of movement and at least partially through said further range of movement.

4. A hydrostatic steering system as set forth in claim 2 wherein said steering control valve defines a pilot orifice which directs pilot fluid from said load sense port to the reservoir when said steering control valve is in said neutral position, said steering control valve restricting the size of said pilot orifice as said steering control valve moves away from said neutral position and as said control valve moves at least partly through its operating range, said steering control valve completely blocking flow through said pilot orifice at least when said steering control valve has moved completely through its operating range.

5. A hydrostatic steering system as set forth in claim 4 wherein at least about 1 gal/min of fluid is communicated by the pilot fluid circuit to the load sense port of said steering controller when said steering circuit is in a standby condition.

6. A hydrostatic steering system for operating a vehicle steering motor comprising a source of fluid, a hydrostatic steering controller having an inlet port, a load sense port, a metering unit, and a control valve, a main fluid circuit communicating fluid from said source to the inlet port of the controller, a pilot fluid circuit for directing pilot fluid from said source to the load sense port of the controller, means responsive to fluid pressure in the pilot fluid circuit for controlling fluid flow in the main fluid circuit to the inlet port of the controller, said control valve having a neutral position and being movable away from said neutral position in accordance with an operator's demand and a steering load for directing and controlling fluid flow from the inlet port and the load sense port to the metering unit and from the metering unit to the steering motor, the control valve directing pilot fluid from the load sense port to a reservoir when the control valve is in its neutral position and communicating pilot fluid from the load sense port to the metering unit as the control valve moves away from its neutral position, said metering unit being operable at a rate which corresponds to the operator's demand and the steering load when the rate of fluid being directed to the metering unit equals the rate at which metered fluid is being directed to the steering motor, the pilot fluid circuit directing sufficient pilot fluid to the load sense port for the metering unit to operate at a rate which corresponds to the operator's demand and the steering load over a range of operator demands and steering loads, said control valve, when in said neutral position, blocking fluid at said inlet port of said hydrostatic steering controller, said control valve being biased to said neutral position and, in response to rotation of the vehicle's steering wheel, being movable away from said neutral position and to an operating condition in which it establishes a main flow control orifice communicating said inlet port with said metering unit, said control valve as it moves away from said neutral position restricting the flow of pilot fluid to the reservoir and communicating pilot fluid to the metering unit at a rate such that the pilot fluid directed to the metering unit is sufficient for the metering unit to operate at a rate which corresponds to the operator's demand and the steering load over said range of operator demands and steering loads, said control valve being movable through a predetermined range of movement away from said neutral position in order to reach said operating condition, said control valve when in said operating condition having a further range of movement away from its neutral position in which the flow area of said main flow control orifice varies directly in accordance with variations in an operator's demand or the steering load, said control valve progressively restricting the flow of pilot fluid to the reservoir as it moves through said predetermined range of movement and at least partially through said further range of movement, said source including a variable displacement pump having an outlet, said pilot fluid circuit including a main pilot conduit communicating with the load sense port of the controller, and first and second branch pilot conduits, and said means responsive to fluid pressure in the pilot fluid circuit including actuator means for controlling the displacement of the pump, a flow compensator valve for effecting operation of the actuator means, and a priority valve which communicates fluid from the pump to the inlet port of the controller, said priority valve including an inlet communicating with the source, a priority outlet communicating with the inlet port of the hydrostatic steering controller, an auxiliary outlet, a pilot outlet connected to the main pilot conduit, a priority valve element for controlling a flow of fluid communicated to the inlet port of the controller, first biasing means biasing the priority valve element to a priority position in which it communicates the inlet with the priority outlet and blocks communication between the inlet and the auxiliary outlet, and means defining a pilot fluid pressure cavity at one end of the valve element so that fluid in said cavity produces a fluid pressure force acting on the valve element, the priority outlet of the priority valve being communicated with the other end of the priority valve element, the priority valve element being movable away from its priority position when fluid pressure force on said other end of the priority valve element exceeds the force of the first biasing means and the fluid pressure force on said one end of the valve element, the priority valve element as it moves away from its priority position (i) gradually restricting communication between the inlet and the priority outlet and (ii) establishing and gradually increasing communication between the inlet and the priority outlet, said first branch pilot conduit branching from the priority outlet of the priority valve and directing pilot fluid through the pilot fluid pressure cavity to the pilot outlet, the first branch pilot conduit including a first orifice located between the priority outlet and the pilot fluid pressure cavity and a second orifice located between the pilot fluid pressure cavity and the pilot outlet, said second branch pilot conduit branching from the priority outlet of the priority valve in parallel with the first branch pilot conduit and directing additional pilot fluid from the priority outlet to the main pilot conduit, said actuator means including second biasing means urging the actuator means to a maximum displacement position and fluid actuated means for opposing the second biasing means, said flow compensator valve including a flow compensator valve element, third biasing means for biasing the flow compensator valve element to a first position in which the displacement of the pump is at a maximum value, and means defining pressure cavities at opposite ends of the flow compensator valve element, the outlet of the pump communicating with the pressure cavity at one end of the flow compensator valve element and fluid pressure in the main pilot circuit being communicated to the pressure cavity at the other end of the flow compensator valve element, said flow compensator valve element being movable away from its first position when a net fluid pressure force on the element exceeds the force of said third biasing means, said flow compensator valve element when moved away from its first position communicating fluid from the fluid pressure cavity at said one end of said flow compensator valve element to the fluid actuated means which opposes the second biasing means, thereby to reduce the displacement of the pump.

7. A hydrostatic steering system as set forth in claim 1 wherein said steering control valve defines a pilot orifice which directs pilot fluid from said load sense port to the reservoir when said steering control valve is in said neutral position, said steering control valve restricting the area of said pilot orifice as said steering control valve moves through said predetermined range of movement away from said neutral position and as said control valve moves at least partly through its further range of movement away from the neutral position, said steering control valve completely blocking flow through said pilot orifice at least when said steering control valve has moved completely through its further range of movement away from the neutral position.

8. A hydrostatic steering system for operating a vehicle steering motor comprising a source of fluid, a hydrostatic steering controller having an inlet port, a load sense port, a metering unit, and a control valve, said control valve having a neutral position and being movable away from said neutral position in accordance with an operator's demand and a steering load for directing and controlling fluid flow from the inlet port and the load sense port to the metering unit and from the metering unit to the steering motor, a main fluid circuit communicating fluid from said source to the inlet port of the controller, a pilot fluid circuit for directing pilot fluid from said source to the load sense port of the controller in the neutral position of the control valve, and means responsive to fluid pressure in the pilot fluid circuit for controlling fluid flow in the main fluid circuit to the inlet port of the controller, the control valve directing pilot fluid from the load sense port to a reservoir when the control valve is in its neutral position and communicating pilot fluid from the load sense port to the metering unit as the control valve moves away from its neutral position, said metering unit being operable at a rate which corresponds to the operator's demand and the steering load when the rate of fluid being directed to the metering unit equals the rate at which metered fluid is being directed to the steering motor, the pilot fluid circuit directing sufficient pilot fluid to the load sense port for the metering unit to operate at a rate which corresponds to the operator's demand and the steering load over a range of operator demands and steering loads.

9. A hydrostatic steering system as defined in claim 8 wherein said control valve, when in said neutral position, blocks fluid at said inlet port of said hydrostatic steering controller, said control valve being biased to said neutral position and, in response to rotation of the vehicle's steering wheel, being movable away from said neutral position and to an operating condition in which it establishes a main flow control orifice communicating said inlet port with said metering unit, said control valve as it moves away from said neutral position restricting the flow of pilot fluid to the reservoir and communicating pilot fluid to the metering unit at a rate such that the pilot fluid directed to the metering unit is sufficient for the metering unit to operate at a rate which corresponds to the operator's demand and the steering load over said range of operator demands and steering loads.

10. A hydrostatic steering system as defined in claim 9, wherein said control valve is movable through a predetermined range of movement away from said neutral position in order to reach said operating condition, said control valve when in said operating condition having a further range of movement away from its neutral position in which the flow area of said main flow control orifice varies directly in accordance with variations in an operator's demand or the steering load, said control valve progressively restricting the flow of pilot fluid to the reservoir as it moves through said predetermined range of movement and at least partially through said further range of movement.

11. A hydrostatic steering system for operating a vehicle steering motor comprising;
(a) a fluid source which delivers fluid for operating the steering motor,
(b) a hydrostatic steering controller having a rotatable input member, an inlet port for receiving fluid from the source, an outlet port for directing fluid to a reservoir, a working port for directing fluid to the steering motor, and a load sense port,
said hydrostatic steering controller having a metering unit, and a control valve which is biased to a neutral position in which it blocks fluid flow from the source to the steering motor, the control valve and the metering unit being connected with the input member in such a manner that upon rotation of the input member the control valve moves away from its neutral position to an operating position in which it (i) directs fluid from the source to the metering unit and (ii) directs metered fluid from the metering unit to the steering motor, the metering unit being operable at a rate which corresponds to an operator's demand and a steering load when the rate of fluid being directed from the source to the metering unit corresponds to the rate of metered fluid being directed to the steering motor,
the control valve, after an initial range of movement away from its neutral position and toward its operating position, establishing a main flow control orifice communicating the inlet port with the metering unit, said control valve having a further range of movement away from its neutral position in which it increases the flow area of the main flow control orifice when there is an increasing need to direct more fluid to the metering unit to enable the metering unit to operate at a rate corresponding to the operator's demand and the steering load,
(c) fluid actuator means for controlling the flow of fluid delivered from the source to the controller,
(d) means biasing said fluid actuator means to a condition in which the source delivers maximum fluid flow and pressure to the inlet port of the steering controller for operating said steering motor, the fluid actuator means being movable against the bias of said biasing means to reduce the fluid flow and pressure directed to the controller when a fluid pressure force exerted on the actuator means exceeds a force exerted by the biasing means, and
(e) a pilot fluid circuit which branches from the fluid delivered from the source to the inlet port of the steering controller and communicates pilot fluid with the load sense port of the controller in the neutral position of the control valve, the control valve directing the pilot fluid from the load sense port to the reservoir when the control valve is in its neutral position, the pilot fluid circuit controlling the fluid pressure force acting on said fluid actuator means so that when the control valve is in its neutral position the flow and pressure delivered from the source to the steering controller is reduced to a standby level at which the pilot fluid being directed to the reservoir is sufficient for the metering unit to operate at a rate which corresponds to the operator's demand and the steering load over a range of operator demands and steering loads,
said steering control valve (i) restricting the flow of pilot fluid to the reservoir and communicating pilot fluid from said load sense port to the metering unit during movement of said steering control valve through its initial range of movement away from its neutral position and through at least part of its further range of movement away from its neutral position and (ii) directing fluid from the pilot circuit to the metering unit at a rate sufficient for the metering unit to operate at a rate which corresponds to the operator's demand and the steering load over the range of operator demands and steering loads.

* * * * *